(12) United States Patent
Tominaga

(10) Patent No.: US 9,351,002 B2
(45) Date of Patent: May 24, 2016

(54) IMAGE PROCESSING APPARATUS, IMAGE PICKUP APPARATUS, COMPUTER, IMAGE PROCESSING METHOD AND COMPUTER READABLE NON-TRANSITORY MEDIUM

(71) Applicant: FUJIFILM CORPORATION, Tokyo (JP)

(72) Inventor: Kenichirou Tominaga, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 14/566,012

(22) Filed: Dec. 10, 2014

(65) Prior Publication Data

US 2015/0098499 A1    Apr. 9, 2015

Related U.S. Application Data

(63) Continuation of application No. PCT/JP2013/061999, filed on Apr. 24, 2013.

(30) Foreign Application Priority Data

Jun. 11, 2012   (JP) .................................. 2012-131824

(51) Int. Cl.
*H04N 7/32* (2006.01)
*H04N 19/117* (2014.01)
(Continued)

(52) U.S. Cl.
CPC ......... *H04N 19/117* (2014.11); *H04N 5/23229* (2013.01); *H04N 9/045* (2013.01);
(Continued)

(58) Field of Classification Search
CPC . H04N 5/23229; H04N 9/045; H04N 19/117; H04N 19/186

USPC ...................................................... 375/240.02
See application file for complete search history.

(56) References Cited

U.S. PATENT DOCUMENTS 6,421,087 B1 *  7/2002  Ikeda ............................ 348/345
6,977,683 B1    12/2005  Okada
(Continued)

FOREIGN PATENT DOCUMENTS

CN        1941874 A        4/2007
JP        04-086157 A      3/1992
(Continued)

OTHER PUBLICATIONS

Japanese Office Action, dated Feb. 3, 2015, in related application No. JP2014-521002.

(Continued)

*Primary Examiner* — William C Vaughn, Jr.
*Assistant Examiner* — Naod Belai
(74) *Attorney, Agent, or Firm* — Birch, Stewart, Kolasch & Birch, LLP

(57) ABSTRACT

An image processing apparatus that compresses image data according to a compression parameter, includes: a data acquisition section that acquires information on whether photographing condition data is added to the image data inputted or not and content of the photographing condition data; a compression parameter determination section that determines the compression parameter according to an acquisition result of the photographing condition data in the data acquisition section; and a compression processing section that applies compression processing to the image data according to the determined compression parameter, wherein the photographing condition data includes information related to presence or absence of an optical low-pass filter at time of photographing an image of the image data.

18 Claims, 20 Drawing Sheets

(51) Int. Cl.
- *H04N 5/232* (2006.01)
- *H04N 9/04* (2006.01)
- *H04N 19/186* (2014.01)
- *H04N 19/196* (2014.01)
- *H04N 19/103* (2014.01)
- *H04N 19/463* (2014.01)
- *H04N 19/124* (2014.01)
- *H04N 19/625* (2014.01)
- *H04N 19/162* (2014.01)

(52) U.S. Cl.
CPC .......... *H04N 19/103* (2014.11); *H04N 19/124* (2014.11); *H04N 19/186* (2014.11); *H04N 19/196* (2014.11); *H04N 19/463* (2014.11); *H04N 19/625* (2014.11); *H04N 19/162* (2014.11)

(56) References Cited

U.S. PATENT DOCUMENTS

| | | | |
|---|---|---|---|
| 2003/0147463 A1 | 8/2003 | Sato et al. | |
| 2004/0207747 A1* | 10/2004 | Ikeda | 348/335 |
| 2007/0014543 A1* | 1/2007 | Nakase et al. | 386/107 |
| 2008/0267495 A1* | 10/2008 | Shimura | 382/166 |
| 2009/0290045 A1 | 11/2009 | Fukuda et al. | |
| 2010/0066868 A1* | 3/2010 | Shohara | 348/241 |
| 2011/0150330 A1* | 6/2011 | Jannard et al. | 382/166 |

FOREIGN PATENT DOCUMENTS

| | | |
|---|---|---|
| JP | 06-014247 A | 1/1994 |
| JP | 06-303480 A | 10/1994 |
| JP | 9-326992 A | 12/1997 |
| JP | 11-168745 A | 6/1999 |
| JP | 2002-354266 A | 12/2002 |
| JP | 2002-369036 A | 12/2002 |
| JP | 2003-289542 A | 10/2003 |
| JP | 2005-101837 A | 4/2005 |
| JP | 2006-352509 A | 12/2006 |

OTHER PUBLICATIONS

International Search Report issued in PCT/JP2013/061999, mailed on May 21, 2013.
Written Opinion issued in PCT/JP2013/061999, mailed on May 21, 2013.
Chinese Office Action issued in corresponding Chinese Patent Application No. 201380030750.7 on Dec. 1, 2015.

* cited by examiner

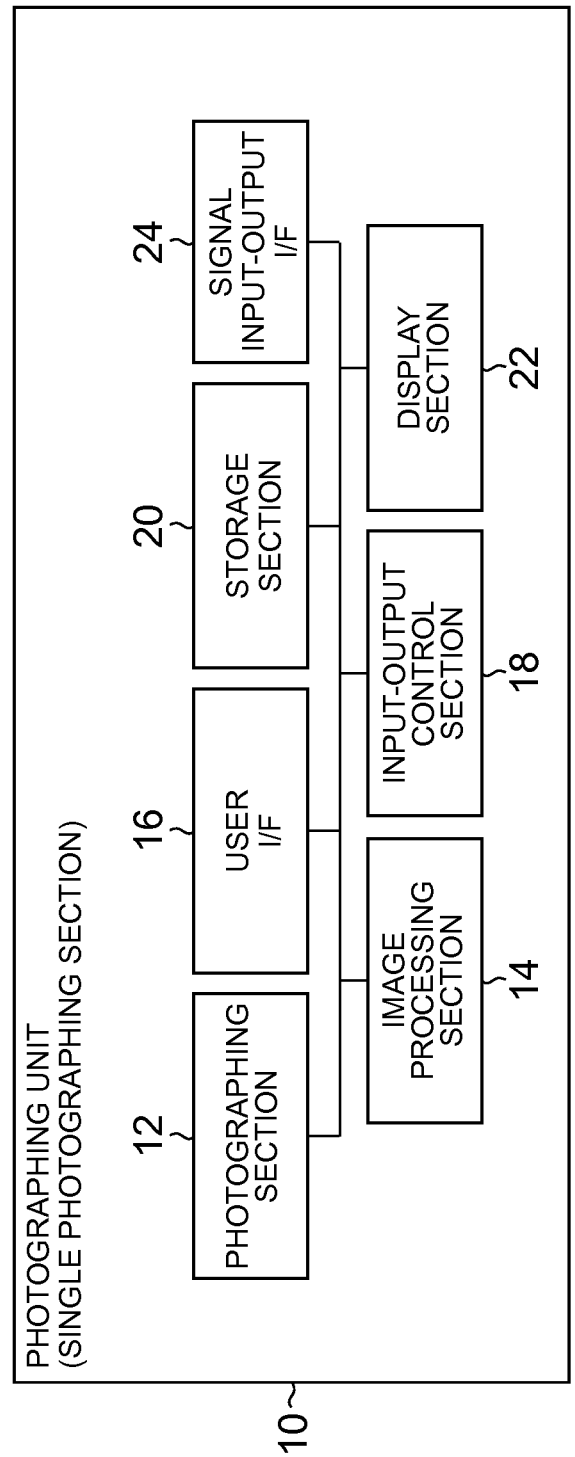

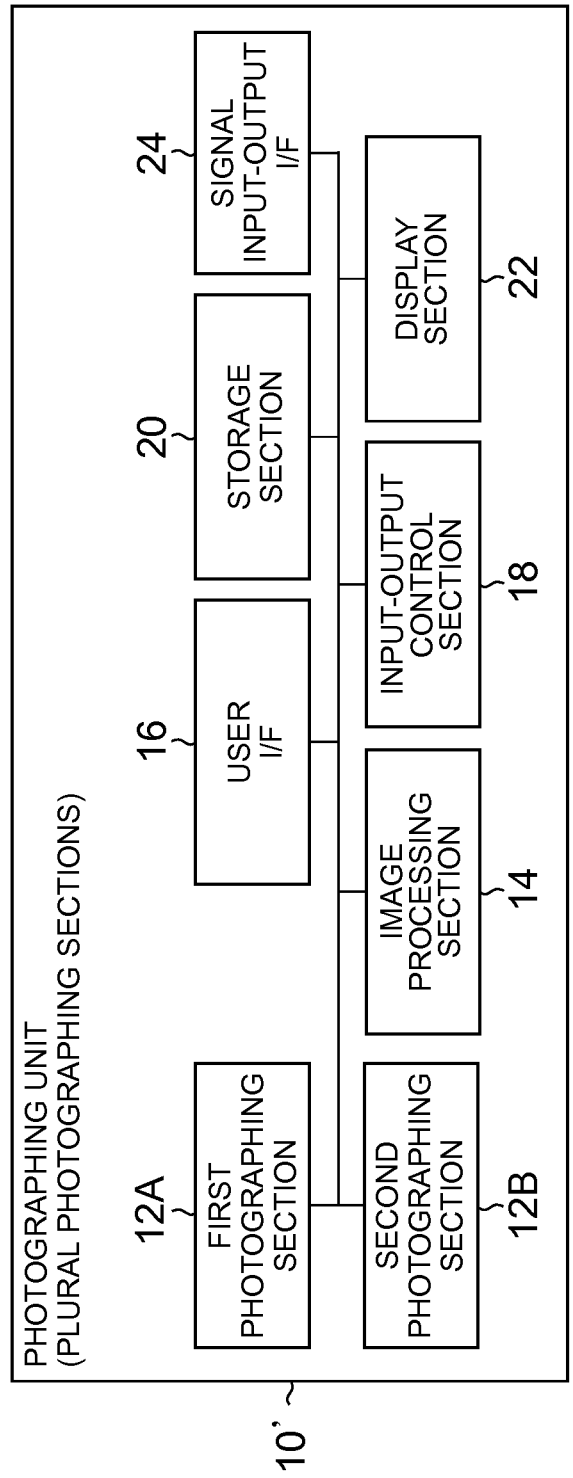

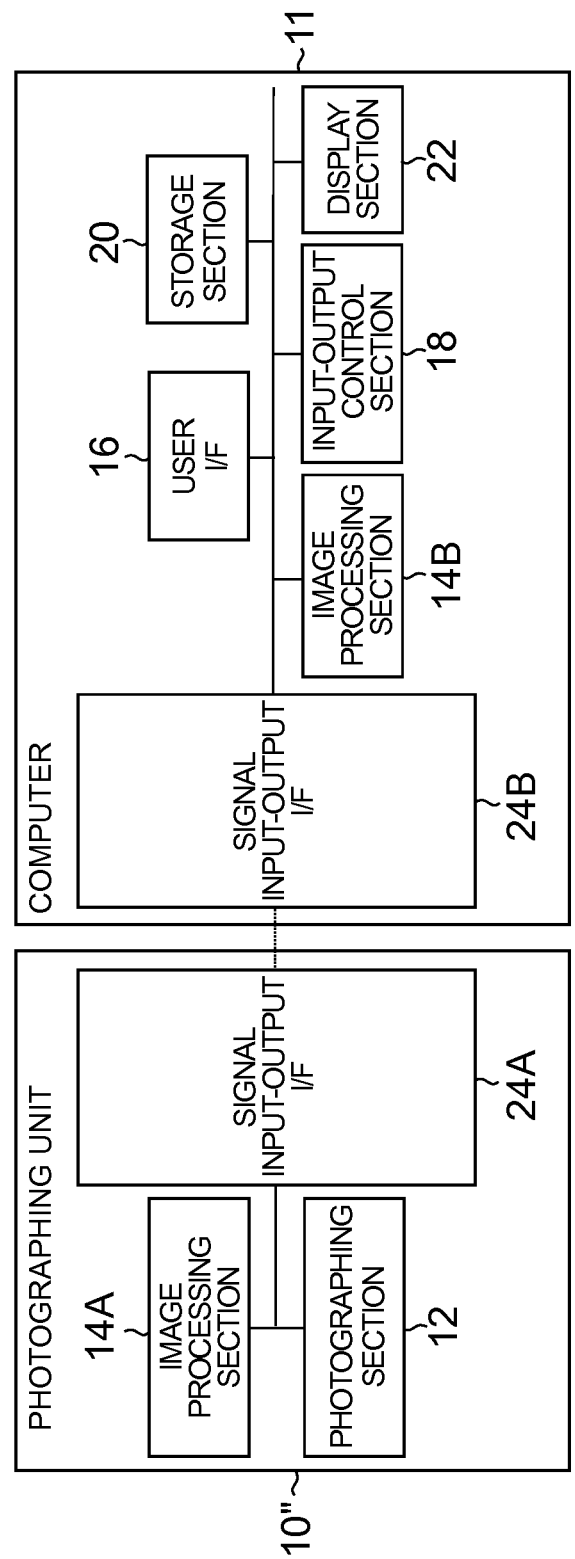

A ARRAY   B ARRAY

IMAGE PROCESSING APPARATUS, IMAGE PICKUP APPARATUS, COMPUTER, IMAGE PROCESSING METHOD AND COMPUTER READABLE NON-TRANSITORY MEDIUM

CROSS-REFERENCE TO RELATED APPLICATIONS

This application is a Continuation of PCT International Application No. PCT/JP2013/061999 filed on Apr. 24, 2013, which claims priority under 35 U.S.C. §119(a) to Japanese Patent Application No. 2012-131824 filed on Jun. 11, 2012. Each of the above applications is hereby expressly incorporated by reference, in their entirety, into the present application.

BACKGROUND OF THE INVENTION

1. Field of the Invention

The present invention relates to an image processing apparatus, an image pickup apparatus, a computer, an image processing method and an application thereof such as a computer readable non-transitory medium, and more particularly, to technologies concerned with compression processing of image data.

2. Description of the Related Art

In the field of image pickup apparatuses such as cameras, a digital photographed image is acquired by using an imaging element (such as a CCD and a CMOS) provided with color filters such as RGB. Captured image data is stored and outputted in various image formats, such as RAW data that is digital data formed by using an electric signal from an imaging element, and a predetermined image format such as a JPEG In particular, according to the JPEG format for compressing image data to reduce the amount of data, the compression rate is relatively high but degradation of image quality is relatively inconspicuous, and therefore the JPEG format is widely used in the field of image pickup apparatuses. Concerning this image compression processing such as a JPEG format, various techniques are proposed.

For example, Japanese patent application publication No. 2003-289542 discloses an image information encoding method capable of quantization based on visual characteristics. According to the method disclosed in Japanese patent application publication No. 2003-289542, different quantization parameters of QPluma and QPchroma are used in compression processing of a luminance signal and a color difference signal respectively. Although weighting of the two quantization parameters can be changed, two arrays A (QP) and B (QP) corresponding to a parameter QP meet the relation, A (QP)×B (QP)=Const. ("Const." means a constant). A quantization matrix can be set by a user in units of pictures, but if the quantization matrix is not set, a predetermined default value is used.

In addition, Japanese patent application publication No. 2002-354266 discloses an image processing apparatus that selects a quantization coefficient corresponding to color components of an input image to reduce degradation of image quality due to image compression processing. According to this image processing apparatus disclosed in Japanese patent application publication No. 2002-354266, the ratio of data components of at least one of luminance data and color difference data is calculated and a quantization parameter is selected in accordance with the calculation result.

Further, Japanese patent application publication No. 11-168745 discloses a digital camera that records digital image pickup data as well as an array of color filters corresponding to respective pixels, as filter array data, in order to reduce a burden of data capacity in a recording medium and enable pixel interpolation desired by a user.

As the number of pixels in an imaging element is increased in recent years, the data size (amount of data) of image pickup data tends to bloat as a whole. Thus, compressing and storing image pickup data while reducing degradation of image quality is one of issues to be solved in a photographing technical field.

In addition, although a high frequency component of image data is removed by using an optical low-pass filter and the like to reduce image degradation such moire, it is possible to acquire a photographed image in which image degradation such moire is sufficiently reduced without using a low-pass filter by devising an array pattern of color filters. Thus, it is possible to acquire a photographed image in which resolution feeling is further improved without positively using an optical low-pass filter and without losing a high frequency component, depending on an array pattern of color filters. However, it is assumed that image data including such a high frequency component may not be sufficiently reduced in size by conventional compression processing, or may not sufficiently take advantage of superiority of including a high frequency.

As described above, a configuration and functions of an image pickup apparatus are also diversified such as presence or absence of an optical low-pass filter, use of color filters of various array patterns, or the like. Unfortunately, it is difficult for the conventional techniques disclosed in Japanese patent application publication Nos. 2003-289542 and 2002-354266 to perform appropriate image compression processing corresponding to the above-described diversification.

For example, the technique disclosed in Japanese patent application publication No. 2003-289542 may enable quantization corresponding to visual characteristics such as preventing a pseudo contour from occurring, but does not optimize image compression processing with respect to the presence or absence of an optical low-pass filter and change of an array pattern of color filters. In addition, Japanese patent application publication No. 2002-354266 discloses an example of a compression processing technique of selecting a quantization coefficient corresponding to color components of an input image, but the technique disclosed in Japanese patent application publication No. 2002-354266 also does not optimize image compression processing with respect to the presence or absence of an optical low-pass filter and change of an array pattern of color filters, as with the technique disclosed in Japanese patent application publication No. 2003-289542. Further, the technique disclosed in Japanese patent application publication No. 11-168745 also does not optimize image compression processing with respect to the presence or absence of an optical low-pass filter and the like.

Thus, it is difficult for the techniques disclosed in Japanese patent application publication Nos. 2003-289542, 2002-354266 and 11-168745 to compress and store image data with a high degree of efficiency while reducing degradation of image quality depending on the presence or absence of an optical low-pass filter and the like.

SUMMARY OF THE INVENTION

The present invention has been contrived in view of the above-mentioned circumstances, an object of the present invention being to provide a technique capable of optimizing image compression processing appropriately with respect to the presence or absence of an optical low-pass filter and the like.

One aspect of the present invention is directed to an image processing apparatus that compresses image data according to a compression parameter, the image processing apparatus comprising: a data acquisition section that acquires information on whether photographing condition data is added to the image data inputted or not and content of the photographing condition data; a compression parameter determination section that determines the compression parameter according to an acquisition result of the photographing condition data in the data acquisition section; and a compression processing section that applies compression processing to the image data according to the determined compression parameter, wherein the photographing condition data includes information related to presence or absence of an optical low-pass filter at time of photographing an image of the image data.

According to this aspect, since the compression parameter is determined on the basis of information related to the presence or absence of an optical low-pass filter, it is possible to apply suitable compression processing appropriate for the presence or absence of an optical low-pass filter, to the image data.

The "compression processing" described here is a concept that may include overall processing of reducing the amount of data, and therefore the processing may include compression processing by using a Joint Photographic Experts Group (JPEG) method and compression processing by using a Tagged Image File Format (TIFF) method. In addition, since the "compression parameter" means a parameter that affects extent of compression, a quantization parameter with respect to a DCT coefficient can be used as a compression parameter in a case of compression by using a JPEG method, for example.

In addition, the "optical low-pass filter" is a filter element that optically cuts a high frequency component of light, and can be appropriately arranged at a position where the high frequency component can be cut from light before an imaging element is irradiated with the light. Information related to the presence or absence of an optical low-pass filter may be directly included in the photographing condition data, and in such a case where the presence or absence of an optical low-pass filter is determined for each of models of an image pickup apparatus, for example, another information such as a model name with which information of the presence or absence of an optical low-pass filter can be indirectly acquired may be included in the photographing condition data.

Desirably, the photographing condition data includes information related to a color filter array of a photographing section that is used at the time of photographing the image of the image data.

According to this aspect, since the compression parameter is determined on the basis of information related to a color filter array, it is possible to apply suitable compression processing appropriate for array pattern characteristics of the color filters, to the image data.

The "color filters" are filter elements through which light passes when an imaging element is irradiated with the light so that intensity of the light for each color is determined, and primary color filters (such as red, green, and blue) or complementary color filters (such as cyan, magenta yellow and green) can be used as the color filters. An array pattern of color filters and constituent color elements are not particularly limited. Information related to the color filter array may be directly included in the photographing condition data, and in such a case where the color filter array is determined for each of models of an image pickup apparatus, for example, another information such as a model name with which information of the color filter array can be indirectly acquired may be included in the photographing condition data.

Desirably, the image processing apparatus into which image data of images photographed by a plurality of photographing sections including at least a first photographing section and a second photographing section is inputted, further comprises: a display section that indicates a compression level in such a manner that the compression level can be selected from among a plurality of selection candidates; and a selection section that receives a selection by a user with respect to the compression level, wherein the compression parameter determination section determines the compression parameter with respect to the image data of an image photographed by the first photographing section according to the acquisition result of the photographing condition data with respect to the image data of the image photographed by the first photographing section and a selection result of the compression level received through the selection section, and determines the compression parameter with respect to the image data of an image photographed by the second photographing section according to the acquisition result of the photographing condition data with respect to the image data of the image photographed by the second photographing section and the selection result of the compression level received through the selection section, and wherein the compression processing section applies the compression processing to each of the image data of the image photographed by the first photographing section and the image data of the image photographed by the second photographing section, according to the determined compression parameter.

According to this aspect, since the compression parameter is determined on the basis of not only a compression level but also photographing condition data of a photographing section, it is possible to carry out determination of a compression parameter and compression processing according to characteristics of each of a plurality of photographing sections including the first photographing section and the second photographing section.

Since the "photographing section" described here is a concept that may include various apparatuses contributing to creation of image pickup data, a so-called imaging element itself can be regarded as the photographing section, and it is also possible to regard an overall structure including lenses and the like that guide light to an imaging element, as the photographing section. Thus, it is possible to apply this aspect to an image processing apparatus into which data of photographed images including data of an image photographed by an image pickup apparatus having a different imaging element or a different structure between lenses and imaging elements is inputted.

In addition, the "compression level" is an index that directly or indirectly indicates extent of compression, and that determines extent of compression of a plurality of levels. For example, it is also possible that the compression level is set at two levels (a normal mode (high compression mode) and a fine mode (low compression mode)), at three levels (a normal mode (high compression mode), a fine mode (low compression mode), and a superfine mode (ultra-low compression mode)), or at a plurality of levels more than the above so that a user can select a desired compression level (mode).

The photographing condition data according to this aspect may include information capable of identifying characteristics of a photographing section that acquires image data, in addition to information related to the presence or absence of an optical low-pass filter and information related to a color filter array. By determining a compression parameter with use of the "information capable of identifying characteristics of a photographing section" described above, it is possible to determine the compression parameter while taking advantage of characteristics of the photographing section. If there is a difference between the first photographing section and the second photographing section in photographing performance, for example, information reflecting the photographing performance (such as the number of pixels capable of photographing, the amount of image pickup data, and the photographing sensitivity) can be adopted as "information capable of identifying characteristics of a photographing section".

Desirably, the image data includes luminance data; and the compression parameter is based on a ratio of an amount of data for which the luminance data accounts.

According to this aspect, a compression parameter is determined on the basis of the ratio of the amount of data for which luminance data accounts. For example, in a case where compression processing is performed on the basis of luminance data and color difference data as with compression processing by a JPEG method, the compression processing is performed so that color difference data is more reduced, because human visual perception is more sensitive to luminance change than to color difference. In such a case, by determining the ratio of the amount of data for which luminance data accounts with respect to the amount of data for which color difference data accounts after the compression processing on the basis of the "information related to the presence or absence of an optical low-pass filter" and the "information related to a color filter array", it is possible to determine a compression parameter optimized for the photographing condition data above and to perform compression processing.

Desirably, the compression parameter is a compression rate.

According to this aspect, it is possible to determine a compression rate according to the "information related to the presence or absence of an optical low-pass filter" and the "information related to a color filter array".

The "compression rate" described here is based on the ratio of the amount of data between before and after the compression processing, and is an index that directly or indirectly indicates this ratio. Thus, the compression rate here may include not only a compression rate that is directly determined, but also an element (parameter) that indirectly indicates the ratio of the amount of data between before and after the compression processing in a state of the range in which data compression is available being divided into a plurality of levels.

Desirably, the compression processing is compression processing of a JPEG method that includes the steps of: calculating a DCT coefficient from the image data according to discrete cosine transform; and quantizing the DCT coefficient according to a quantization table, and the compression parameter is the quantization table.

According to this aspect, in the compression processing of a JPEG method, the quantization table is determined on the basis of the information on the presence or absence of an optical low-pass filter and the information on a color filter array, so that compression processing optimized on the basis of the information above is available.

Desirably, the image processing apparatus further comprises a display section that indicates a determination result of the compression parameter in the compression parameter determination section.

According to this aspect, since a determination result of the compression parameter is indicated on the display section, a user can confirm the determination result of the compression parameter through the display section. An indication method on the display section is not particularly limited, and warning a user of the determined compression parameter may be available, and indication of allowing a user to select acceptance (decision)/unacceptance (non-decision) of the determination result of the compression parameter may be available.

Desirably, the compression parameter determined by the compression parameter determination section includes a plurality of selection candidates; the display section indicates the compression parameter in such a manner that the compression level can be selected from among the plurality of selection candidates; the image processing apparatus further comprises a selection section that receives a selection by a user with respect to the compression parameter; the compression parameter determination section decides the compression parameter according to a selection result received through the selection section; and the compression processing section applies the compression processing to the image data according to the decided compression parameter.

According to this aspect, a user can select a compression parameter from among a plurality of selection candidates indicated on the display section, and the compression parameter is determined according to a result of the selection by the user. Thus, it is possible to determine an appropriate compression parameter according to user needs.

Desirably, the information related to the color filter array is information on whether or not color filters of a photographing section used at the time of photographing the image of the image data correspond to color filters arranged in a plurality of pixels including photoelectric conversion elements arranged in a first direction and a second direction perpendicular to the first direction in a manner of a predetermined color filter array, the color filter array including a predetermined basic array pattern in which the color filter array includes a first filter corresponding to a first color that most contributes to acquiring a luminance signal and second filters corresponding to two or more second colors other than the first color, the basic array pattern being repeatedly arranged in the first direction and the second direction, the first filter being arranged in each of lines in the first direction, the second direction and a third direction inclined at 45° to each of the first direction and the second direction of the color filter array, at least one or more of the second filters being arranged in each of lines in the first direction and the second direction of the color filter array in the basic array pattern, a ratio of a pixel number of the first color corresponding to the first filter being larger than a ratio of a pixel number of each of the second colors corresponding to the second filters.

Desirably, the color filter array includes a part where two or more pixels of the first filter continues in each of a line in the first direction, a line in the second direction and a line in the third direction.

Desirably, in the color filter array, the first filters are arranged at a center and four corners in a 3×3 pixel group, and the 3×3 pixel group is repeatedly arranged in the first direction and the second direction.

Desirably, the second colors include a first constituent color and a second constituent color; the predetermined basic array pattern is a square array pattern corresponding to 6×6 pixels; and the color filter array includes a first array and a second array being alternately arranged in the first direction and the second direction, the first array corresponding to 3×3 pixels in which the first filters are arranged at a center and four corners and in which the second filters corresponding to the first constituent color are arranged in such a manner that the first filter at the center is positioned between the second filters corresponding to the first constituent color in the first direction and the second filters corresponding to the second constituent color are arranged in such a manner that the first filter at the center is positioned between the second filters corresponding to the second constituent color in the second direction, the second array corresponding to 3×3 pixels in which the first filters are arranged at a center and four corners and in which the second filters corresponding to the first constituent color are arranged in such a manner that the first filter at the center is positioned between the second filters corresponding to the first constituent color in the second direction and the second filters corresponding to the second constituent color are arranged in such a manner that the first filter at the center is positioned between the second filters corresponding to the second constituent color in the first direction.

Desirably, the first color is green (G), and the second colors are red (R) and blue (B).

Another aspect of the present invention is directed to an image pickup apparatus comprising: a photographing unit including a photographing section for photographing an image of image data; and the image processing apparatus as defined above.

The image pickup apparatus according to this aspect is not particularly limited, and the "image pickup apparatus" described here may include mobile devices and the like provided with functions other than photographing (a call function, a communication function, and other computer functions), in addition to a digital camera with a primary function of photographing.

Another aspect of the present invention is directed to an image pickup apparatus comprising: a photographing unit having a plurality of photographing sections including at least a first photographing section and a second photographing section that photograph images of image data; and the image processing apparatus as defined above.

The image pickup apparatus according to this aspect is not particularly limited, and the "image pickup apparatus" described here may include mobile devices and the like provided with functions other than photographing (a call function, a communication function, and other computer functions), in addition to a digital camera including a plurality of photographing sections with a primary function of photographing (such as a 3D-capable camera).

Another aspect of the present invention is directed to an image pickup apparatus comprising: a photographing unit that includes a photographing section that photographs an image of image data, the photographing section being selectable from among a plurality of photographing sections including at least a first photographing section and a second photographing for exchange; and the image processing apparatus as defined above.

The image pickup apparatus according to this aspect is not particularly limited, and the "image pickup apparatus" described here may include a digital camera and the like in which a lens and an imaging element (such as a CCD or a CMOS) can be exchanged by a user, for example.

Another aspect of the present invention is directed to a computer comprising the image processing apparatus as defined above.

Another aspect of the present invention is directed to an image processing method comprising: a data acquisition step of acquiring information on whether photographing condition data is added to image data inputted or not and content of the photographing condition data; a compression parameter determination step of determining a compression parameter according to an acquisition result of the photographing condition data; and a compression processing step of applying compression processing to the image data according to the determined compression parameter, wherein the photographing condition data includes information related to presence or absence of an optical low-pass filter at time of photographing an image of the image data.

Another aspect of the present invention is directed to a computer readable non-transitory medium storing instructions causing a computer to perform an image processing method comprising the steps of: acquiring information on whether photographing condition data is added to image data inputted or not and content of the photographing condition data; determining a compression parameter according to an acquisition result of the photographing condition data; and applying compression processing to the image data according to the determined compression parameter, wherein the photographing condition data includes information related to presence or absence of an optical low-pass filter at time of photographing an image of the image data.

According to the present invention, a compression parameter is determined on the basis of photographing conditions including information related to the presence or absence of an optical low-pass filter, and image compression processing optimized based on the photographing conditions is available.

BRIEF DESCRIPTION OF THE DRAWINGS

FIG. 1A is a function block diagram for illustrating an apparatus and the like to which the present invention is applicable, FIG. 1A showing an example of an image pickup apparatus including one imaging element.

FIG. 1B is a function block diagram for illustrating an apparatus and the like to which the present invention is applicable, FIG. 1B showing an example of an image pickup apparatus including two (plural) imaging elements.

FIG. 1C is a function block diagram for illustrating an apparatus and the like to which the present invention is applicable, FIG. 1C showing an example of an image pickup apparatus in which a photographing section and an image processing section (compression processing section) are separately provided.

FIG. 5A shows an example of a basic array pattern of color filters, FIG. 5A showing color filters of a Bayer array.

FIG. 5B shows an example of a basic array pattern of color filters, FIG. 5B showing color filters of an array of another type.

DESCRIPTION OF THE PREFERRED EMBODIMENTS

Figure 2:
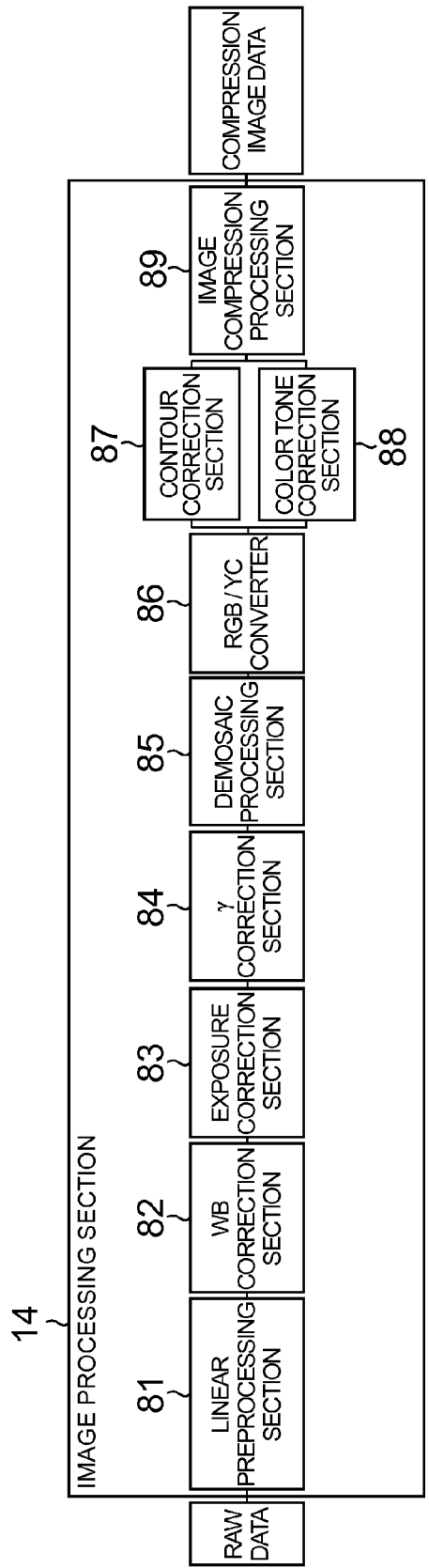
FIG. 2 is a function block diagram showing an example of digital processing in an image processing section.

Hereinafter, embodiments of the present invention will be described with reference to the accompanying drawings. First, an outline of the present invention will be described, and then specific application examples will be described. Since configurations described below are merely examples, the present invention can be applied to other configurations. In addition, each configuration can be appropriately achieved by using arbitrary hardware, software or combination of hardware and software.

The present invention relates to technologies concerned with compression processing of image data, and is applicable to general apparatuses and the like capable of applying compression processing to image data. Thus, the present invention also can be achieved by using an image pickup apparatus such as a camera, or a computer to which an image pickup apparatus is connected, for example.

FIG. 1A is a function block diagram showing an example of an image pickup apparatus including one imaging element, and FIG. 1B a function block diagram showing an example of an image pickup apparatus including two (plural) imaging elements. In addition, FIG. 1C is a function block diagram showing an example of an image pickup apparatus and a computer to which the image pickup apparatus is connected.

FIG. 1A shows a photographing unit 10 that includes: a photographing section 12, an image processing section (image processing apparatus) 14, a user I/F (user interface) 16, an input-output control section 18, a storage section 20, a display section 22 and a signal input-output I/F (signal input-output interface) 24, which are connected to each other.

The photographing section 12 performs photographing to create image pickup data (image data), and includes an imaging element (such as a CCD or a CMOS) provided with a lens, a diaphragm, a shutter and a color filter, for example, and the like, if necessary. The photographing section 12 may include an optical low-pass filter (OLPF) described later, or may not include it.

The image processing section 14 applies digital image processing to the image pickup data (RAW data) created by the photographing section 12, and applies off-set correction processing, WB (White Balance) correction processing, pixel with clipped highlights detection correction processing, exposure correction processing, γ (gamma) correction processing, demosaic (demosaicing) processing, image compression processing, and the like, for example, to the image pickup data, if necessary.

FIG. 2 is a function block diagram showing an example of digital processing (image processing method) in the image processing section 14.

The image pickup data (RAW data) created by the photographing section 12 includes 14-bit color data of R (red), G (green) and B (blue), for example, and is supplied to a linear preprocessing section 81 of the image processing section 14 by a dot sequential system in the order of R, G, and B. The linear preprocessing section 81 applies preprocessing with respect to linear data, such as off-set adjustment, 16-bit size adjustment, and shading correction, to the RAW data of R, G, and B.

The linear preprocessing section 81 outputs R, G and B data to a white balance (WB) correction section 82. The WB correction section 82 performs white balance correction by multiplying R data, G data, and B data by gain values Rg, Gg, and Bg for white balance correction respectively. In order to set the gain values Rg, Gg, and Bg for white balance correction, the RAW data is analyzed to identify a light source type (such as sunlight, a fluorescent light or a tungsten lamp) for example and then the gain values are set at preset gain values corresponding to the light source type, or a light source type or a color temperature is manually selected in a menu screen for white balance correction and then the gain values are set at gain values corresponding to the selected light source type or color temperature.

The WB correction section 82 outputs the R, G and B data to an exposure correction section 83. The exposure correction section 83 corrects exposure for underexposure (desensitization processing) with respect to normal exposure (i.e. exposure without exposure correction), or for overexposure (sensitization processing) with respect to the normal exposure, in accordance with an exposure correction value (such as −3 EV to +3 EV) that is manually instructed.

The exposure correction section 83 outputs the R, G and B data to a gamma (γ) correction section 84 and linear data is converted into tone data of a color space, such as sRGB, AdobeRBG or scRGB. The R, G and B data to which gamma correction has been applied is outputted to a demosaic processing section 85.

The demosaic processing section 85 interpolates spatial deviation of the R, G and B data associated with a color filter array in the imaging element to simultaneously convert the R, G and B data, and outputs the R, G and B data to which demosaicing has been applied, to an RGB/YC converter 86.

The RGB/YC converter 86 converts the R, G and B data into luminance data (luminance signal) Y and color difference data (color difference signal) Cr and Cb, and outputs the luminance data Y to a contour correction section 87 and outputs the color difference data Cr and Cb to a color tone correction section 88. The contour correction section 87 emphasizes a contour portion (a portion with a large luminance change) of the luminance data Y. The color tone correction section 88 performs matrix calculation based on received color difference signals Cr and Cb and a color correction matrix coefficients of 2 rows by 2 columns to carry out color correction for achieving favorable color reproducibility.

The color correction matrix coefficient is appropriately changed in accordance with an instruction for color correction inputted from a user.

An image compression processing section 89 serves as an image processing section that compresses image data on the basis of a compression parameter. The image compression processing section 89 of the present example performs compression processing on the basis of the luminance data Y to which contour correction has been applied, and the color difference data Cr and Cb to which color tone correction has been applied, to create compression image data of a JPEG format or the like.

Details of the compression processing performed by the image compression processing section 89 will be described later (refer to FIG. 11).

Figure 3A:
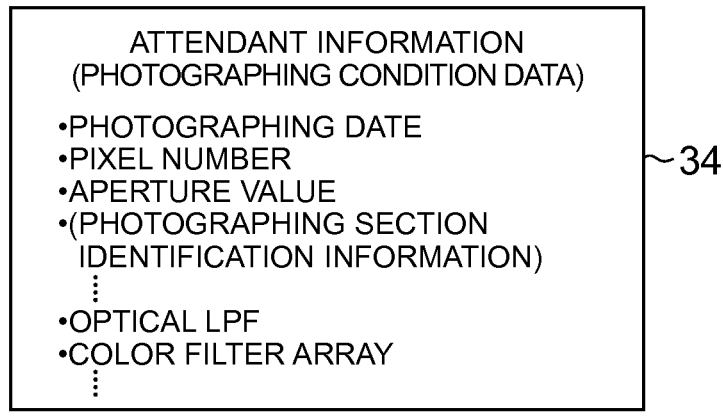
FIG. 3A shows an outline of input-output image photographing data, FIG. 3A showing an example of attendant information (photographing condition data).
Figure 3B:
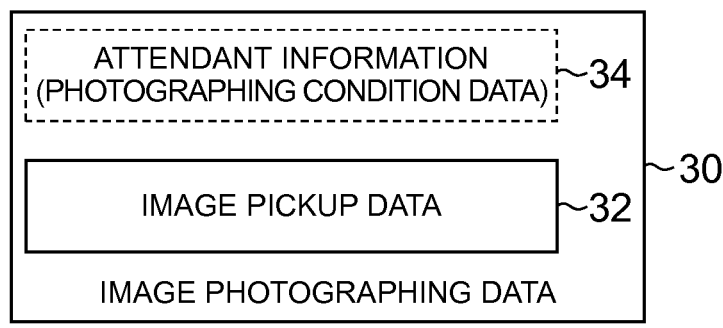
FIG. 3B shows an outline of input-output image photographing data, FIG. 3B showing a data structure of data of photographed images including photographing condition data (attendant information) and image pickup data.
Figure 3C:
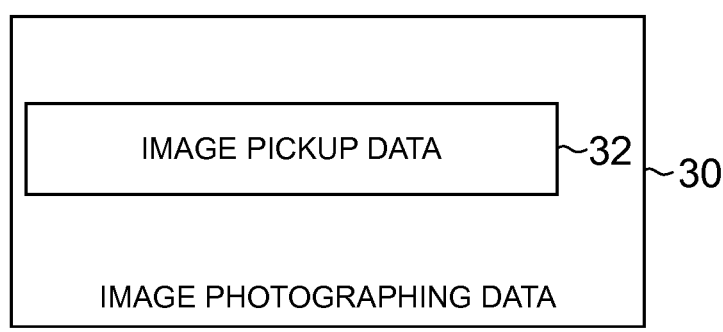
FIG. 3C shows an outline of input-output image photographing data, FIG. 3B showing a data structure of data of photographed images including image pickup data (not including photographing condition data).

Data (photographing condition data such as photographing date, pixel number, F value (refer to FIG. 3A)) 34 of photographing conditions at the time of acquiring image pickup data 32 by using the photographing section 12 illustrated in FIG. 1A may be added to the image pickup data 32 as header information (refer to FIG. 3B), or may not be added to the image pickup data 32 (refer to FIG. 3C). The photographing condition data 34 may be added to the image pickup data 32 in the photographing section 12 at the time of photographing, or may be added to the image pickup data 32 in the image processing section 14 or the like after the photographing. Addition of the photographing condition data 34 to the image pickup data 32 will be described later (refer to FIGS. 7 to 10).

Compression image data to which various image processing and image compression processing have been applied in the image processing section 14 is controlled for output by the input-output control section 18 shown in FIG. 1A, so as to be as follows: stored in the storage section (such as a memory) 20; indicated in the display section (such as a liquid crystal display) 22 with an minified image; or outputted to the outside through the signal input-output I/F 24.

It is possible to provide information on various kinds of processing in the photographing section 12, the image processing section 14, and the input-output control section 18, for a user through the display section 22. A user also can transmit a control instruction signal to the photographing section 12, the image processing section 14, and the input-output control section 18, through the user I/F 16, while checking the information shown in the display section 22. Particularly, in the present example, a compression parameter (determined result) determined by the image processing section 14 (compression parameter determination section) is indicated on the display section 22.

The image processing including the image compression processing described above can be performed in a photographing unit 10' including a plurality of photographing sections (a first photographing section 12A and a second photographing section 12B) as shown in FIG. 1B, as well. That is, as with the photographing unit 10 provided with one photographing section (see FIG. 1A), it is possible that the image processing section 14 applies various image processing and compression processing to image pickup data created in each of the first photographing section 12A and the second photographing section 12B to create compression image data, and that the input-output control section 18 performs input-output control to store the compression image data in the storage section 20, to indicate a minified image of the compression image data on the display section 22, or to output the compression image data to the outside through the signal input-output I/F 24. In addition, the photographing unit 10' is also same as the photographing unit 10 in that a user can transmit a control instruction signal to the photographing sections (the first photographing section 12A and the second photographing section 12B), the image processing section 14 and the input-output control section 18, through the user I/F 16.

As a configuration of an exchangeable photographing section, it is also possible to adopt a photographing unit in which the photographing section is selectable from among a plurality of photographing sections including at least the first photographing section and the second photographing section for exchange. It is also possible to configure the first photographing section 12A and the second photographing section 12B shown in FIG. 1B to be detachable, for example, so that any one of the first photographing section 12A and the second photographing section 12B is selected to be usable. As an apparatus and the like adopting the configuration above, there is a camera (such as a camera with interchangeable lenses) in which a lens unit (photographing section) including a lens and an imaging element, for example, is exchangeable.

Although FIG. 1A and FIG. 1B show examples in which the photographing sections 12, 12A, and 12B, and the image processing section 14 are provided in a single body, a photographing section and an image processing section (particularly an image compression processing section) may be separately provided as shown in FIG. 1C.

For example, the present invention is also applicable to a system in which a photographing unit 10" provided with the photographing section 12 and the computer 11 provided with an image processing section (particularly image compression processing section) 14B are connectable to each other through signal input-output I/Fs 24A and 24B.

In such a case above, the image processing section may be provided in the photographing unit 10" (refer to reference numeral "14A" in FIG. 1C), or may be provided in the computer 11 (refer to reference numeral "14B" in FIG. 1C). In a case where the image processing section 14A is provided in the photographing unit 10", data of photographed image after digital image processing is outputted from the photographing unit 10" through the signal input-output I/F 24A and is inputted to the computer 11 through the signal input-output I/F 24B. The data of photographed image inputted and outputted in such a case may include image data (such as RAW data) to which various image processing has not been applied in the image processing section 14A, in addition to image data to which the various image processing has been applied in the image processing section 14A. In a case where image data to which various image processing has not been applied, such as RAW data, is inputted to the computer 11, the image processing section 14B of the computer 11 applies various image processing and image compression processing to the image data, and under the control of the input-output control section 18, the image data is appropriately outputted to the storage section 20, the display section 22 and the signal input-output I/F 24B.

The functional configuration above is not only applicable to "an image pickup apparatus (system) including the photographing unit 10" provided with the photographing section 12 that captures and generates image data and a computer provided with the image processing section (image compression processing section) 14B" shown in FIG. 1C, but also to "an image pickup apparatus (system) including the photographing unit provided with a plurality of photographing sections including at least the first photographing section 12A and the second photographing section 12B and a computer provided with the image processing section (image compression processing section)" as in a case where the photographing unit 10' shown in FIG. 1B is connected to the computer 11.

Next, a more detailed specific example in which the photographing unit 10 of a type shown in FIG. 1A described above is applied to a digital camera will be described.

Figure 4:
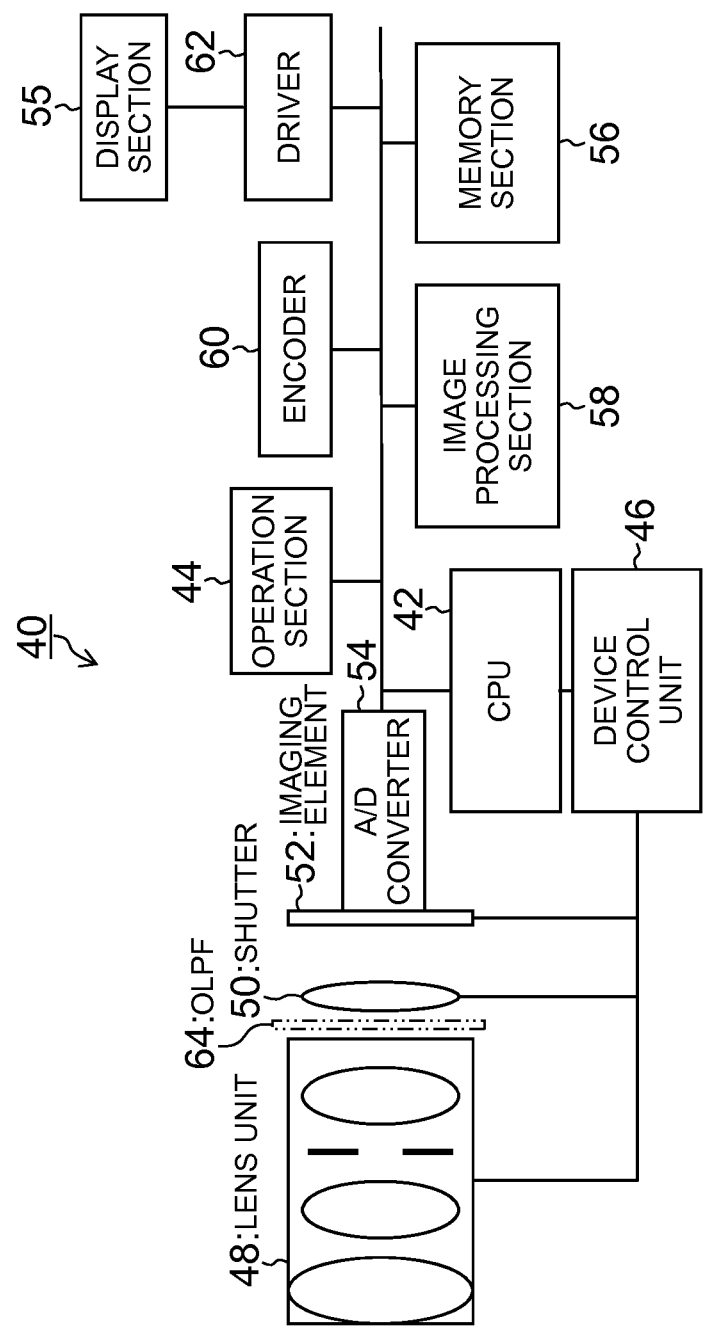
FIG. 4 is a block diagram showing one embodiment of an image pickup apparatus (digital camera).

FIG. 4 is a block diagram showing one embodiment of an image pickup apparatus (digital camera).

The image pickup apparatus 40 is a digital camera storing a photographed image in an inside memory (memory section 56) or an external storage media (not shown), and an operation of the whole device is centrally controlled by a central processing unit (CPU) 42.

The image pickup apparatus 40 includes an operation section (selection section) 44 provided with: a shutter button (shutter switch), a mode dial, a playback button, a MENU/OK key, a cross key, a zoom button, a BACK key, and the like. A signal from the operation section 44 is inputted into the CPU 42, and the CPU 42 controls each circuit in the image pickup apparatus 40 on the basis of the input signal, for example, controls a lens unit 48, a shutter 50, and an imaging element 52 serving as an image acquisition section through a device control unit 46 as well as performs photographing operation control, image processing control, image data storing/playback control, display control of a display section 55, and the like.

The lens unit 48 includes a focus lens, a zoom lens, a diaphragm, and the like. Luminous flux which has passed through the lens unit 48 and the shutter 50 forms an image on a light receiving surface of the imaging element 52.

The imaging element 52 is a color image sensor such as a Complementary Metal-Oxide Semiconductor (CMOS) type, an XY address type or a Charge Coupled Device (CCD) type, and has a structure in which color filters and a large number of light-receiving elements (photodiodes) for receiving light passing through the color filters are arranged to form a two-dimensional array. A subject image formed on the light receiving surface of each of the photodiodes is converted into the amount of signal voltage (or electric charge) corresponding to the amount of incident light of the subject image. Thus, the color filters are arranged on a plurality of pixels composed of photoelectric conversion elements arranged in a horizontal direction (first direction) and a vertical direction (second direction) perpendicular to the horizontal direction, so as to form a predetermined color filter array.

Figures 5A, 5B:
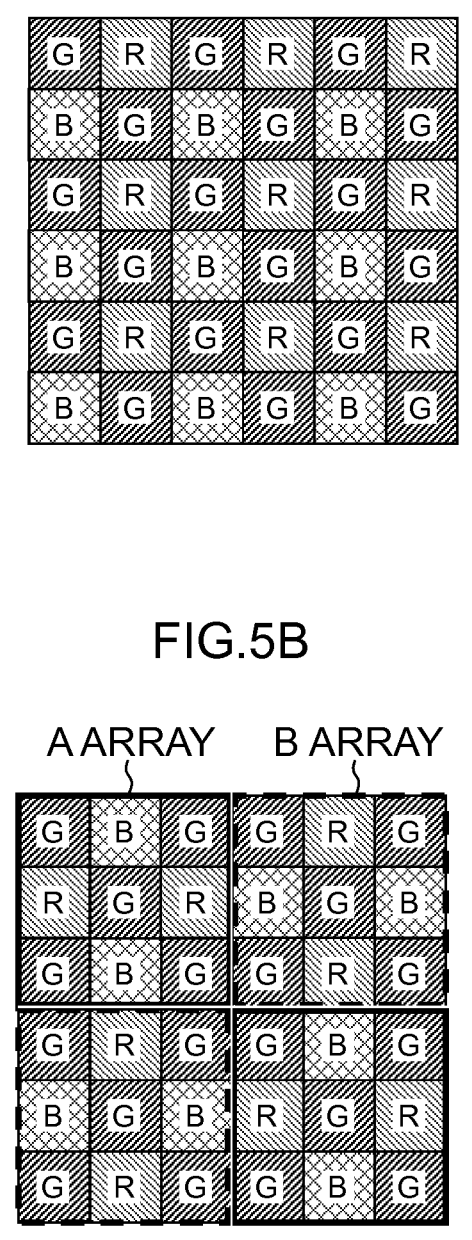

Each of FIGS. 5A and 5B shows an example of a basic array pattern of color filters, FIG. 5A showing color filters of a so-called Bayer array, FIG. 5B showing color filters of an array of another type. In FIGS. 5A and 5B, a red filter is indicated as "R", a green filter is indicated as "G", and a blue filter is indicated as "B".

The color filter array of the imaging element 52 of the present example is formed by repeatedly arranging a basic array pattern P composed of a square array pattern corresponding to M×N (6×6) pixels horizontally and vertically. Thus, when image processing is applied to RAW data (mosaic image) of RGB read out from the imaging element 52, it is possible to perform the image processing in accordance with the repeated pattern. In a color filter array as described above, filters (an R-filter, a G-filter and a B-filter) of respective colors of red (R), green (G) and blue (B) are arranged in a predetermined cycle.

In the color filters of the Bayer array shown in FIG. 5A, for example, a row (horizontal row) in which the G-filter and the R-filter are alternately arranged, and a row in which the G-filter and the B-filter are alternately arranged, are alternately arranged vertically so that the G-filters are arranged at up and down, and left and right positions of each of the R-filters and each of the B-filters. In addition, the B-filters are arranged at positions in an oblique direction of each of the R-filters, the R-filters are arranged at positions in an oblique direction of each of the B-filters, and the G-filters are arranged at positions in oblique directions of each of the G-filters.

On the other hand, in the color filters of another array shown in FIG. 5B, an A-array of 3×3 pixels surrounded by solid lines and a B-array of 3×3 pixels surrounded by broken lines are alternately arranged horizontally and vertically.

Each of the A-array and the B-array is provided with G-filters that are arranged at four corners and the center thereof so that the G-filters are aligned on both diagonals. In the A-array, the R-filters are arranged horizontally across the G-filter at the center, and the B-filters are arranged vertically across the G-filter at the center. On the other hand, in the B-array, the B-filters are arranged horizontally across the G-filter at the center, and the R-filters are arranged vertically across the G-filter at the center. That is, though the A-array and the B-array have position relations between the R-filters and the B-filters which are opposite to each other, the A-array and the B-array have the same arrangement other than the R-filters and the B-filters.

The G-filters at the four corners of the A-array and the B-array form a square array pattern of the G-filters corresponding to 2×2 pixels by alternately arranging the A-array and the B-array horizontally and vertically.

Figure 6:
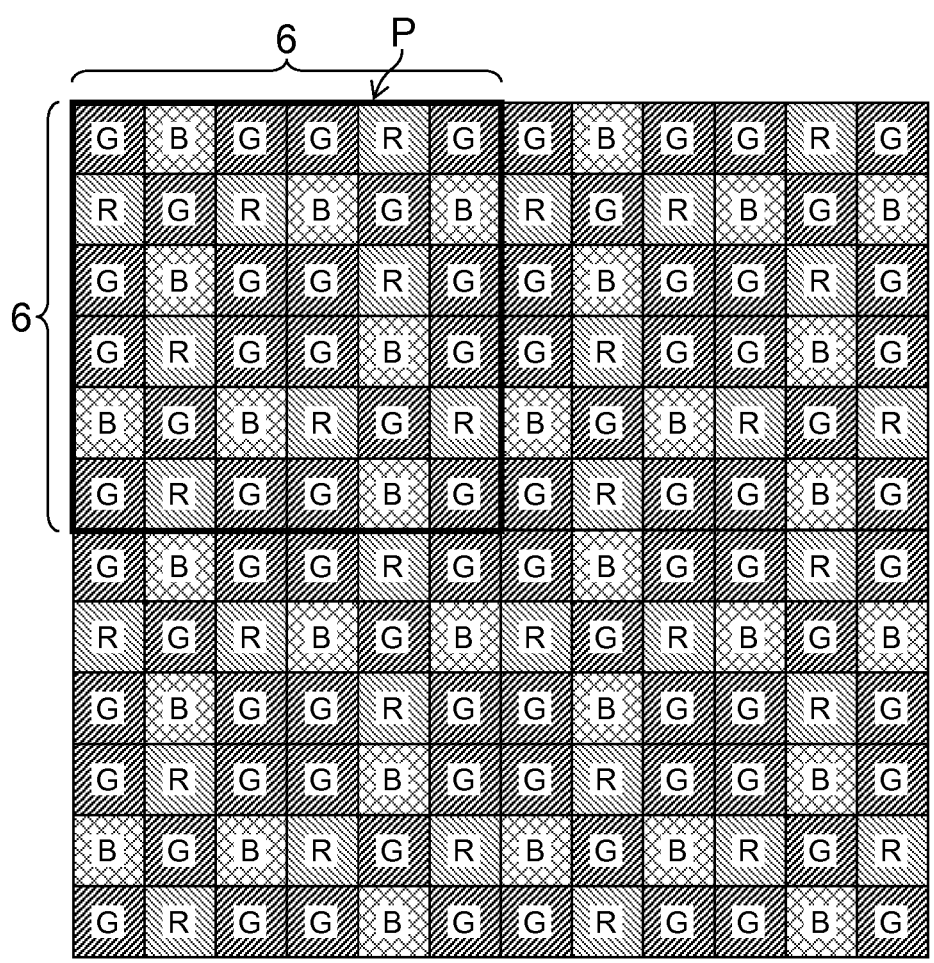
FIG. 6 shows a color filter array in which two sets of the color filters of the basic array pattern shown in FIG. 5B are arranged horizontally and vertically side by side.

FIG. 6 shows a color filter array in which two sets of the color filters of the basic array pattern shown in FIG. 5B are arranged horizontally and vertically side by side. In the color filter array, as obvious from FIG. 6, one or more of the G-filters corresponding to a color generally most contributing to acquisition of a luminance signal (G color in the embodiment) are arranged in each of lines in horizontal, vertical, oblique upper right (NE), and oblique lower right (NW) directions.

The NE represents the oblique upper right direction, and the NW represents the oblique lower right direction. For example, in the case of a square array of pixels, each of the oblique upper right and oblique lower right directions inclines at 45° with respect to the horizontal direction, and in the case of a rectangle array of pixels, each of the oblique upper right and oblique lower right directions is a diagonal direction of the rectangle; therefore an angle of the directions with respect to the horizontal direction may vary depending on a length of each of the long side and the short side.

According to the color filter array above, since the G-filters corresponding to luminance-based pixels are arranged in each of lines in horizontal, vertical and oblique (NE and NW) directions in the color filter array, it is possible to improve reproducibility in demosaic processing in a high frequency region regardless of a direction to be the high frequency region.

In the color filter array shown in FIG. 6, one or more of each of the R-filter and the B-Filter, corresponding to two or more colors other than the G color above (R and B colors in the embodiment), are arranged in each of lines in the horizontal and vertical directions in the basic array pattern.

Since the R-filters and B-filters are arranged in each of lines in the horizontal and vertical directions in the color filter array, it is possible to reduce occurrence of false color (such as color moire). Accordingly, an optical low-pass filter for reducing (preventing) occurrence of a false color may be eliminated. Even if an optical low-pass filter is applied, it is possible to apply a filter with a low function of removing a high frequency component to prevent occurrence of a false color so that resolution is prevented from being decreased.

In addition, in the basic array pattern P in the color filter array shown in FIG. 6, the pixel number of R-pixels, G-pixels and B-pixels, corresponding to the R-filters, the G-filters and the B-filters, in the basic array pattern, is 8 pixels, 20 pixels and 8 pixels respectively. That is, the ratio of the respective pixel numbers of RGB pixels is 2:5:2, so that the ratio of the pixel number of the G-pixels most contributing to acquisition of a luminance signal is larger than the ratio of the pixel numbers of each of the R-pixels and the B-pixels corresponding to the other colors.

As described above, in the color filter array shown in FIG. 6, the ratio of the pixel number of the G-pixels is different from the ratio of the pixel number of each of the R and B pixels. Particularly, since the ratio of the pixel number of the G-pixels most contributing to acquisition of a luminance signal is made larger than the ratio of the pixel number of each of the R and B pixels, it is possible to prevent aliasing when demosaic processing has been performed as well as to improve reproducibility in a high frequency range.

Signal charges accumulated in the imaging element 52 including color filters having the basic array shown in FIGS. 5A and 5B above are read out on the basis of a read-out signal from the device control unit 46, as voltage signals corresponding to the signal charges. The voltage signals read out from the imaging element 52 are supplied to an A/D converter (Analog/Digital converter) 54, and then are sequentially converted into R, G and B digital signals corresponding to the color filter array and are temporarily stored in the memory section 56.

The memory section 56 includes an SDRAM serving as a volatile memory, a EEPROM (storage means) serving as a rewritable nonvolatile memory, and the like, and the SDRAM is used as a work area when the CPU 42 executes a program, and as a storage area in which photographed and acquired digital image signals are temporarily stored. On the other hand, the EEPROM stores a camera control program including an image processing program, defect information on pixels of the imaging element 52, and various parameters, tables, and the like to be used for image processing including mixed color correction, and the like.

An image processing section 58 applies predetermined signal processing (refer to FIG. 2) to the digital image signals temporarily stored in the memory section 56.

Image data which has been processed by the image processing section 58 is encoded to image display data by an encoder 60, and is outputted to the display section 55 provided on a back face of the camera through a driver 62. Accordingly, the subject image is continuously displayed on a display screen of the display section 55.

When the shutter button of the operation section 44 is pressed to a first level (half press), the CPU 42 controls an Automatic Focus (AF) operation and an Automatic Exposure Adjustment (AE) operation to start to move a focus lens of the lens unit 48 in an optical axis direction through the device control unit 46 so that the focus lens reaches an in-focus position.

When the shutter button is pressed halfway, the CPU 42 calculates brightness (photographing Ev value) of a subject on the basis of image data outputted from the A/D converter 54 to determine exposure conditions (F value and shutter speed) in accordance with the photographing Ev value.

When the shutter button is pressed to a second level (all press) after the AE operation and the AF operation are finished, actual photographing is performed by controlling the diaphragm, the shutter 50 and an electric charge accumulate time span in the imaging element 52 under the exposure condition determined Image data (RAW data) of mosaic images of RGB (images corresponding to the color filter arrays shown in FIGS. 5A, 5B and 6) is read out from the imaging element 52 at the time of the present photographing and is converted for A/D conversion by the A/D converter 54, and then the image data is temporarily stored in the memory section 56.

The image data temporarily stored in the memory section 56 is appropriately read out by the image processing section 58, and then the predetermined signal processing including the mixed color correction, the white balance correction, the gamma correction, the demosaic processing, the RGB/YC conversion, and the like, is here applied to the image data. The image data (YC data) to which the RGB/YC conversion has been applied is compressed in accordance with a predetermined compression format (such as a JPEG method), and the compressed image data is stored in an internal memory or an external memory in form of a predetermined image file (such as an Exif file).

In some cases, the image pickup apparatus 40 is provided with an optical low-pass filter (OLPF) 64 for optically blocking a high frequency component of light with which the imaging element 52 is irradiated. In a case where color filters having a basic array of the Bayer type shown in FIG. 5A are used, for example, a high frequency component of an acquired image tends to cause image degradation such as moire. Thus, in a case where image data is acquired by using color filters such as a Bayer type where a high frequency component tends to contribute to image degradation, providing the optical low-pass filter 64 can prevent the image degradation. On the other hand, in a case where color filters having the basic array shown in FIG. 5B are used, image degradation such as moire can be effectively reduced as described above. Accordingly, it is possible to acquire image data with high resolution while a high frequency component is left, by not providing the optical low-pass filter.

As described above, it may be appropriately determined whether the optical low-pass filter 64 is provided or not depending on a device configuration such as a type of an imaging element (color filter) used in the image pickup apparatus 40 and specific image processing content.

The image pickup apparatus 40 (refer to FIG. 4) described above is configured as follows: the lens unit 48, the optical low-pass filter 64, the shutter 50 and the imaging element 52 serve as the photographing sections 12, 12A and 12B in FIGS. 1A to 1C; the image processing section 58 serves as the image processing section 14, 14A, and 14B in FIGS. 1A to 1C; the operation section 44 serves as the user I/F 16 in FIGS. 1A to 1C; the CPU 42 serves as the input-output control section 18 in FIGS. 1A to 1C; the encoder 60 and the driver 62 serve as the input-output control section 18 in FIGS. 1A to 1C; the memory section 56 serves as the storage section 20 in FIGS. 1A to 1C; and the display section 55 serves as the display section 22 in FIGS. 1A to 1C.

Next, the photographing condition data 34 that is to be added to the image pickup data 32 will be described.

As described above, the photographing condition data 34 includes various information at the time of acquiring the image pickup data 32 (refer to FIG. 3A), and the photographing condition data 34 may be added to the image pickup data 32 (refer to FIG. 3B), or may not be added to the image pickup data 32 (refer to FIG. 3C).

It is not limited where the photographing condition data 34 is added to the image pickup data 32, and the photographing condition data 34 can be added to the image pickup data 32 in any section preceding the image compression processing section 89.

Figure 7:
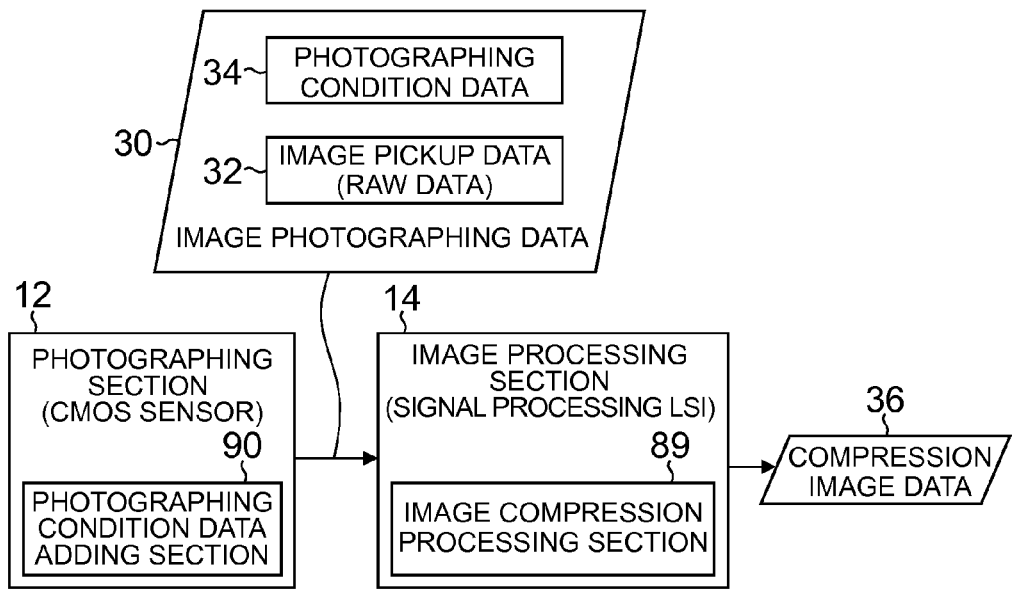
FIG. 7 shows an example of processing of adding photographing condition data to image pickup data.

In a case where the photographing section (such as an imaging element having a CMOS sensor) 12 includes a photographing condition data adding section 90 as shown in FIG. 7, for example, the photographing section 12 captures an image and creates image pickup data (RAW data) 32 of the image, and the photographing condition data adding section 90 adds the photographing condition data 34 to the image pickup data 32. Then, image photographing data 30 including the image pickup data 32 and the photographing condition data 34 is transmitted from the photographing section 12 to the image processing section (signal processing LSI) 14 so that the image compression processing section 89 in the image processing section 14 applies compression processing to the image photographing data 30, and then the image processing section 14 outputs compression image data 36.

Figure 8:
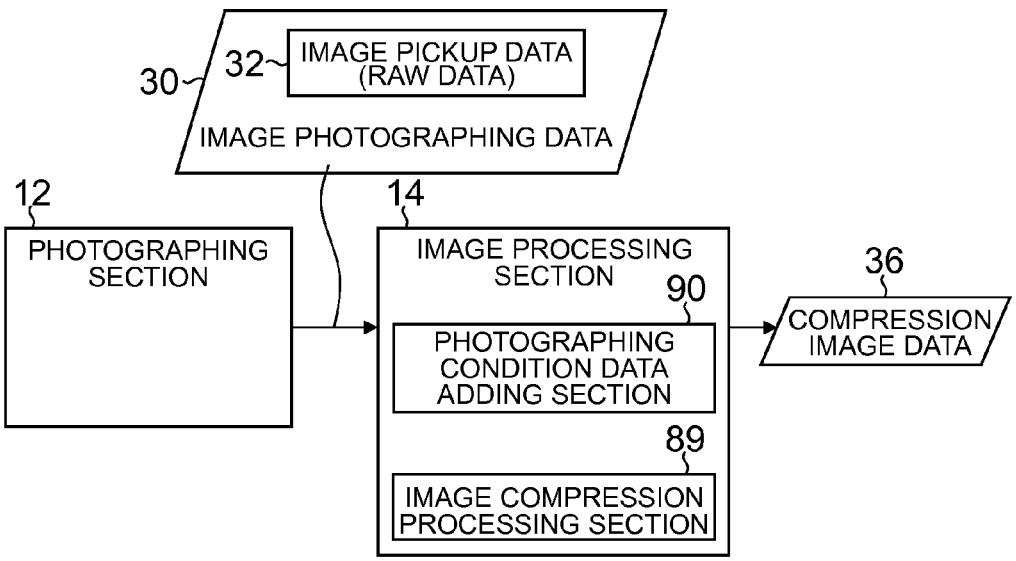
FIG. 8 shows an example of processing of adding photographing condition data to image pickup data.

In addition, in a case where the image processing section 14 instead of the photographing section 12, includes the photographing condition data adding section 90 as shown in FIG. 8, the image photographing data 30 including image pickup data (RAW data) 32 photographed and created by the photographing section 12 is transmitted to the image processing section 14. Then, in the image processing section 14, the photographing condition data adding section 90 adds the photographing condition data 34 to the image pickup data 32, after that the image compression processing section 89 applies compression processing to the image photographing data 30, and then the image processing section 14 outputs the compression image data 36. The photographing condition data 34 can be stored in the storage section 20 (such as a memory), and the image processing section 14 may appropriately read out the photographing condition data 34 stored in the storage section 20 to grasp the photographing condition data 34.

Figure 9:
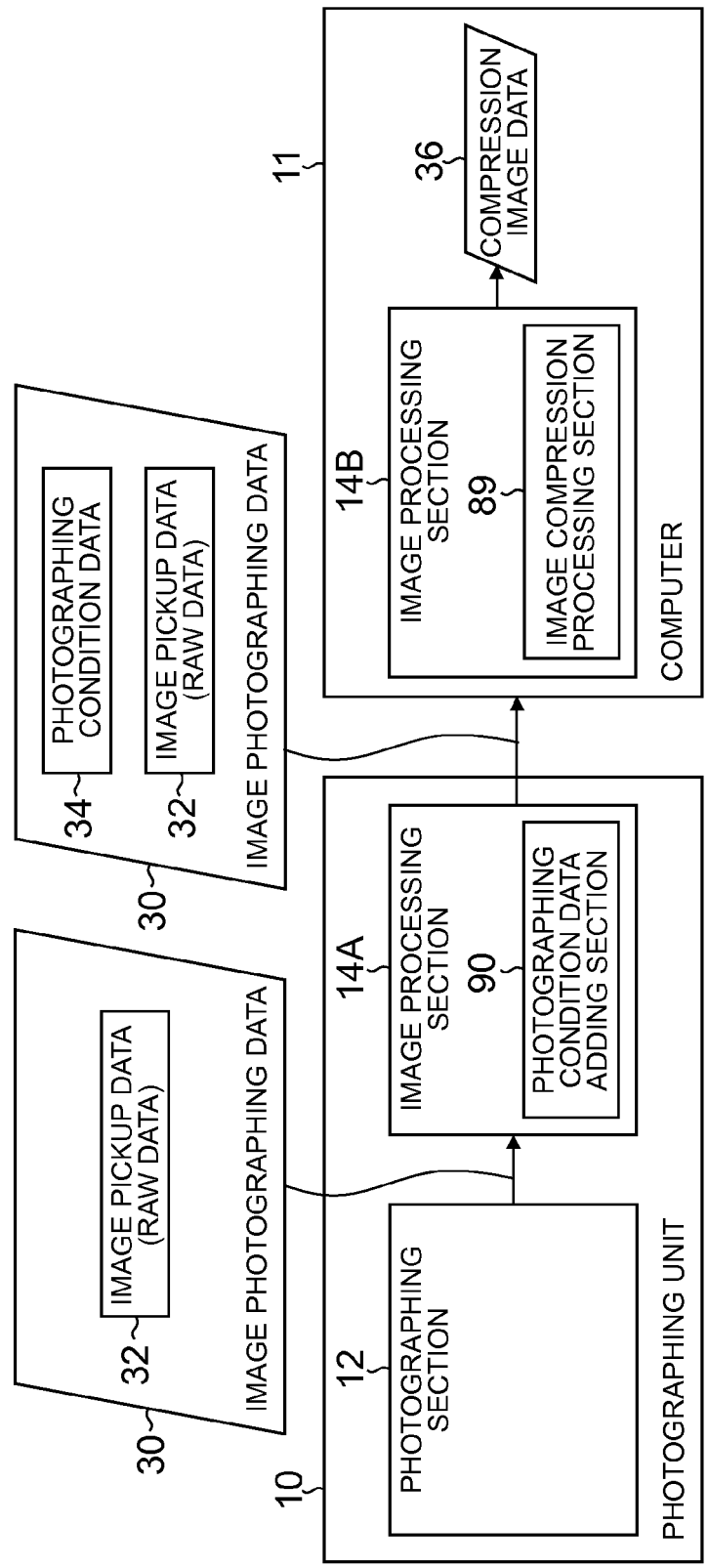
FIG. 9 shows an example of processing of adding photographing condition data to image pickup data.

Further, in a case where the photographing unit 10 and the computer 11 are connected to each other, the image processing section 14A of the photographing unit 10 includes the photographing condition data adding section 90 and the image processing section 14B of the computer 11 includes the image compression processing section 89 as shown in FIG. 9, the image photographing data 30 including the image pickup data (RAW data) 32 photographed and created by the photographing section 12 of the photographing unit 10 is transmitted to the image processing section 14A and the photographing condition data adding section 90 adds the photographing condition data 34 to the image pickup data 32. Then, the photographing unit 10 outputs the image photographing data 30 including the image pickup data 32 and the photographing condition data 34, and the computer 11 receives the image photographing data 30. Then, the image compression processing section 89 of the image processing section 14B of the computer 11 applies compression processing to the image photographing data 30 to create the compression image data 36. In a case where the photographing condition data adding section 90 is provided in the photographing section 12 instead of the image processing section 14A, the photographing section 12 adds the photographing condition data 34 to the image pickup data 32, and then the image photographing data 30 including the image pickup data 32 and the photographing condition data 34 is transmitted to the image processing section 14A of the photographing unit 10 and the image processing section 14B of the computer 11.

Figure 10:
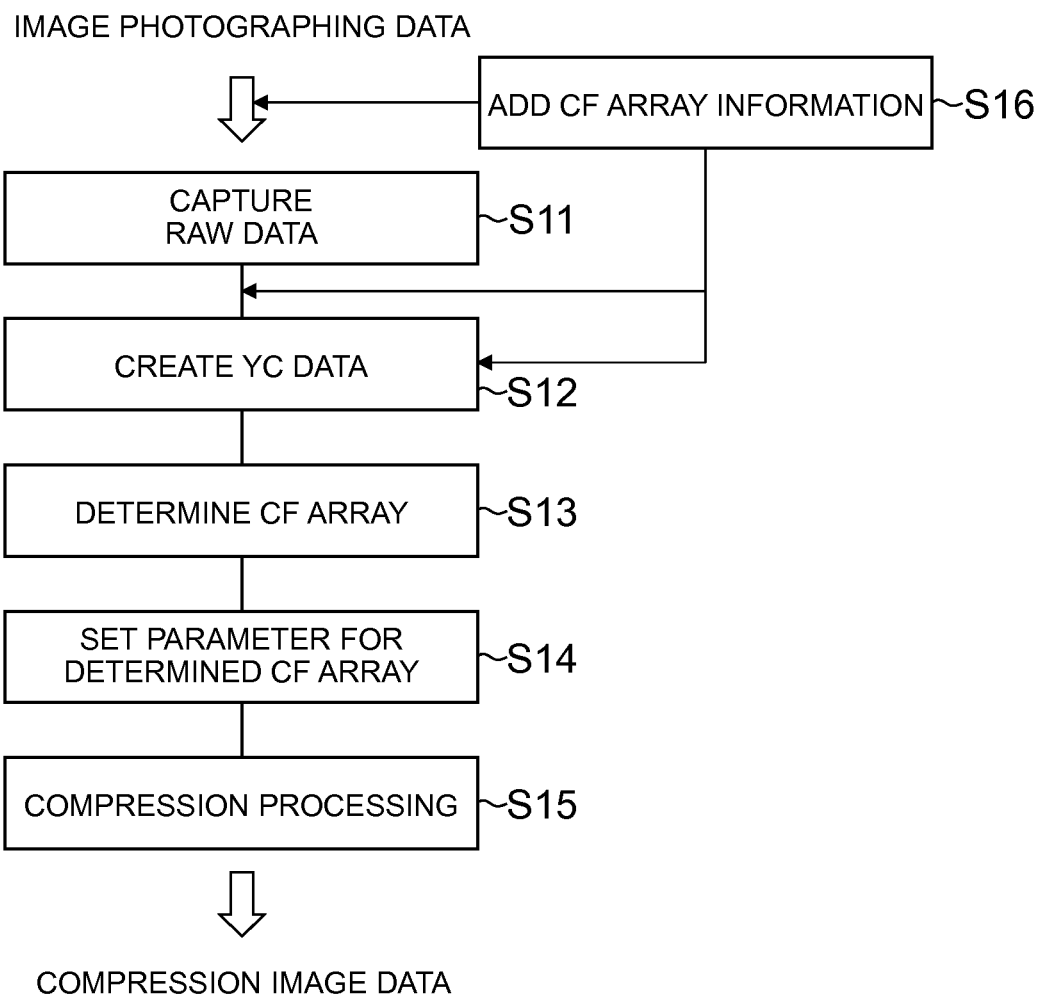
FIG. 10 is a flow chart of image processing showing timing of adding information related to a color filter array (photographing condition data).

FIG. 10 is a flow chart of image processing showing timing of adding information (photographing condition data) related to a color filter (CF) array.

In the image compression processing, first the image pickup data (such as RAW data) 32 is captured from the image photographing data 30 (a step S11 in FIG. 10), and luminance color difference data (YC data) is created (S12). A specific method of creating the luminance color difference data is not particularly limited, so that any method can be adopted. Thus, for example, it is possible to create RGB data of each pixel from the image pickup data (RAW data) 32 by using demosaic processing and then to create so-called Y/Cb/Cr signals from the RGB data.

After that, although an array pattern of color filters is identified (S13), it is possible to add information on color filter array to the RAW data in any stage preceding identification of the color filter array. For example, the information on the color filter array may be added before the RAW data is captured, or may be added after the RAW data is captured as well as before the luminance color difference data is created, or may be added along with creation of the luminance color difference data (S16).

The array pattern of color filters is identified on the basis of color filter array information added as described above (S13), and a compression parameter is determined in accordance with the identified color filter array (S14). Then, compression processing is applied to the image pickup data 32 by using the determined compression parameter (S15) to acquire compression image data.

Next, compression processing by using a JPEG format will be described as an example of image compression processing.

Figure 11:
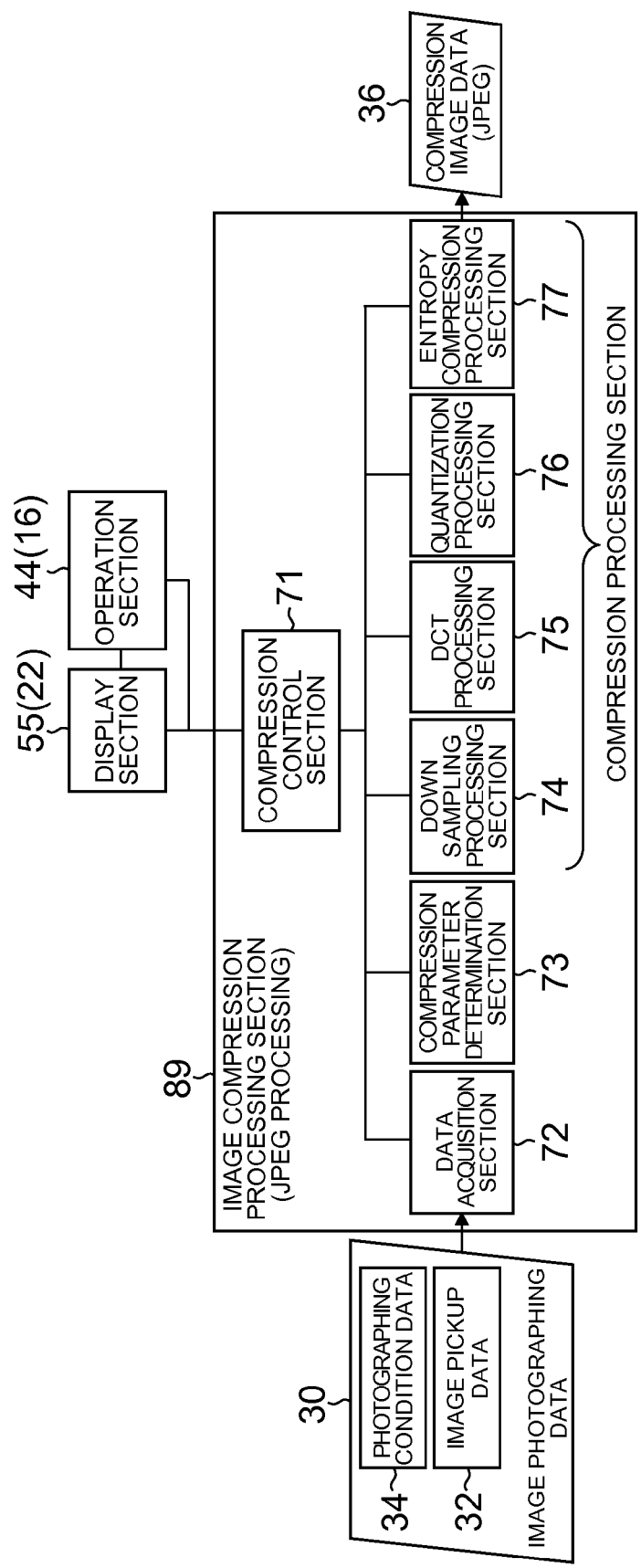
FIG. 11 is a function block diagram of an image compression processing section.

FIG. 11 is a function block diagram of the image compression processing section 89 that creates the compression image data 36 by applying JPEG compression processing to the image photographing data 30 for conversion. The image compression processing section 89 includes: a compression control section 71; and a data acquisition section 72, a compression parameter determination section 73, a downsampling processing section 74, a DCT processing section 75, a quantization processing section 76, and an entropy compression processing section 77 that are comprehensively controlled by the compression control section 71.

The data acquisition section 72 acquires information on whether the photographing condition data 34 is added to the image pickup data (image data) 32 inputted or not and content of the photographing condition data 34. In the present example, the data acquisition section 72 particularly acquires the photographing condition data 34 including "information related to the presence or absence of an optical low-pass filter at the time of photographing an image of the image pickup data 32" and/or "information related to a color filter array of a photographing section used at the time of photographing an image of the image pickup data 32".

The compression parameter determination section 73 determines a compression parameter on the basis of an acquisition result of the photographing condition data by the data acquisition section 72. That is, the compression parameter determination section 73 determines the compression parameter in accordance with reference photographing condition data of a reproducible image space frequency, such as the "information related to the presence or absence of an optical low-pass filter at the time of photographing an image of the image pickup data 32" and the "information related to a color filter array of a photographing section used at the time of photographing an image of the image pickup data 32". The compression parameter determined here is an arbitrary parameter that affects a compression ratio. In the case of compression processing by using the JPEG format, for example, the compression parameter determination section 73 determines a parameter based on a ratio of the amount of data for which luminance data accounts (refer to the downsampling processing section 74 described later) and a parameter of quantization with respect to a DCT coefficient (refer to the DCT processing section 75 described later) as the compression parameter.

Such determination above of a compression parameter in the compression parameter determination section 73 may be processed by a dialogic operation that urges a user to determine (decide) the compression parameter, or may be processed on the basis of a determination result by the compression parameter determination section 73 without urging the user to determine the compression parameter. In the case of the dialogic operation with the user, for example, the compression parameter determination section 73 can indicate a determination result in the display section 55 in a selectable manner. In that case, the user can select, through the operation section 44, whether to decide the determination result by the compression parameter determination section 73 indicated in the display section 55 or not.

The operation section 44 can be provided with an arbitrary configuration. Thus, the operation section 44 may be integrally provided with the display section 55, or may be provided separately from the display section 55. The operation section 44 and the display section 55 that are integrally provided, such as a touch panel, allows a user to intuitively perform selection determination and decision selection indicated in the display section 55. In addition, in a case where the operation section 44 includes a button and the like provided separately from the display section 55, the user can perform selection determination and decision selection by allowing an indication such as a cursor indicated in the display section 55 to correspond to a desired selection candidate using the operation section 44.

The compression parameter to be determined by the compression parameter determination section 73 may include a plurality of selection candidates, and in such a case, the display section 55 can indicate a processing parameter of compression processing from among the plurality of selection candidates in a selectable manner. Accordingly, the user can select a candidate to be adopted as the processing parameter from among the plurality of selection candidates indicated in the display section 55, and the compression parameter determination section 73 can decide the compression parameter in accordance the selection by the user.

The downsampling processing section 74 applies downsampling processing (sub sampling processing) for reducing the amount of color information (color difference data) to the image pickup data 32. The downsampling processing is based on the fact that human visual perception is more insensitive to color difference than to luminance change, and the downsampling processing of setting a ratio (downsampling ratio) of "Y:Cb:Cr" of "4:2:2" or "4:1:1" is usually performed.

The downsampling ratio in the downsampling processing section 74 may be included in a compression parameter determined in the compression parameter determination section 73. That is, the compression parameter determination section 73 may determine a downsampling ratio of luminance color difference data at an optimal value depending on the presence or absence of an optical low-pass filter and the color filter array, and the downsampling processing section 74 may perform downsampling of the image pickup data 32 by using the optimum downsampling ratio determined. As described above, by optimizing the compression parameter based on the data amount rate of the luminance data (Y) with respect to the color difference data (Cb and Cr) in accordance with the photographing condition data, it is possible to realize the image compression processing which can be effectively performed while image degradation can be suppressed.

The DCT processing section 75 converts a pixel signal (brightness pixel value) of the image pickup data 32 to which the downsampling processing has been applied, into a value (DCT coefficient) indicating a size of a space frequency component by using Discrete Cosine Transform (DCT). Then, the quantization processing section 76 quantizes the DCT coefficient to create an approximate DCT coefficient.

Although a detailed description of the DCT is omitted because the DCT is a technique that is generally used, in consideration of the fact that an influence of a high frequency component with respect to image quality is relatively small, the high frequency component is reduced by quantization of the DCT coefficient to reduce (compress) the amount of information. The quantization of the DCT coefficient is performed on the basis of a quantization table composed of an assembly of quantization steps. A value of each of the quantization steps is determined for each of DCT coefficients to be determined for respective frequency components, and a quantization step with a larger value generally tends to be used with increase in frequency of a component.

The quantization table is prepared for each of compression objects, and a quantization table for luminance data and a quantization table for color difference data are individually prepared, for example.

In addition, the quantization table may be included in a compression parameter to be determined in the compression parameter determination section 73. That is, it is preferable that the compression parameter determination section 73 determines the quantization table at an optimal value depending on the presence or absence of an optimum low-pass filter and a color filter array and the quantization processing section 76 quantizes the DCT coefficient of the image pickup data 32 by using the optimum quantization table.

In addition, in a case where the image pickup data 32 in which images are photographed by a plurality of photographing sections (such as imaging elements) is processed, the quantization table can be prepared for each of the photographing sections. That is, preparing a quantization table corresponding to characteristics (created image characteristics) of each of the photographing sections, for each of the photographing sections, enables a quantization which takes advantage of characteristics of each of the photographing sections.

The entropy compression processing section 77 applies entropy encoding to an approximate DCT coefficient (image pickup data) in which a high frequency component has been reduced by quantizing a DCT coefficient, by using a Huffman code to create a coded signal (compression image data (JPEG) 36). Although a detailed description of the entropy encoding by using the Huffman code is omitted because the entropy encoding is a technique that is generally used, the entropy encoding is variable-length encoding processing in which code length is controlled according to appearance frequency, so that the entropy encoding can optimize encoding.

Thus, in the present example, the compression processing section includes the downsampling processing section 74, the DCT processing section 75, the quantization processing section 76, and the entropy compression processing section 77.

The compression control section 71, for example, controls the downsampling processing section 74 and the quantization processing section 76 on the basis of compression parameters (a downsampling ratio and a quantization table) determined by the data acquisition section 72 and the compression parameter determination section 73. The compression control section 71 is connected to the operation section 44 and the display section 55, and is capable of: allowing the display section 55 to indicate a compression parameter determined by the compression parameter determination section 73; and also ultimately deciding the compression parameter on the basis of an instruction from a user through the operation section 44 and controlling the downsampling processing section 74 and the quantization processing section 76 according to the compression parameter decided.

As a compression parameter to be determined in accordance with photographing condition data in the compression parameter determination section 73, a downsampling ratio in the downsampling processing section 74 and a quantization step value (quantization parameter) of a quantization table in the quantization processing section 76 may be used, and any one of the downsampling ratio and the quantization step value, or both of them are determined in the compression parameter determination section 73. In addition, the ratio (compression rate) of the amount of data between before and after compression processing may be set as the compression parameter so that the compression parameter determination section 73 may determine the downsampling ratio and the quantization step value of the quantization table on the basis of the ratio.

Next, a specific example of the compression processing will be described. The compression processing described below is feasible in an arbitrary apparatus and the like, so that an image pickup apparatus such as a digital camera and a computer to which the image pickup apparatus is connected can perform the compression processing. In addition, an apparatus and the like, such as a computer in which a program (software) for allowing a computer to execute compression processing steps (procedure) below is installed, also can perform the compression processing described below. Such software (such as a program) may be recorded in a non-transitory computer-readable medium such as a ROM.

First Embodiment

Figure 12:
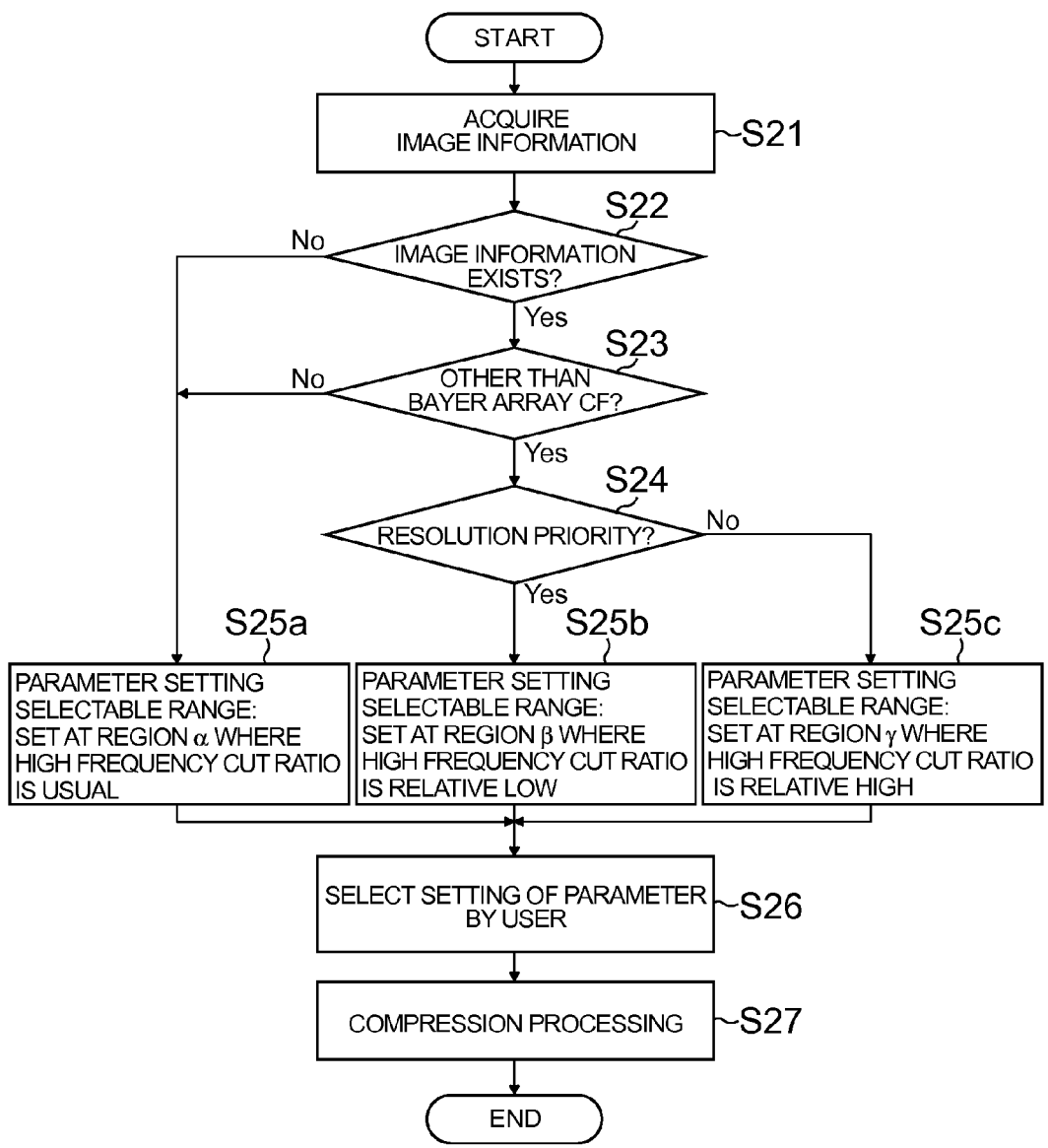
FIG. 12 is a flow chart of determining a compression parameter in accordance with a first embodiment.

An example of compression processing in accordance with a first embodiment will be described with reference to FIGS. 11 and 12. FIG. 12 is a flow chart of determining a compression parameter in accordance with the first embodiment.

In the present embodiment, header information (photographing condition data 34) is referred to at the time of image compression processing, and a selectable range of compression parameters is optimized according to "an array pattern of color filters" so that a user can easily select and determine an optimum compression parameter.

That is, when the image compression processing section 89 receives the image photographing data 30, the data acquisition section 72 acquires information on whether the photographing condition data (image information) 34 is added to the image pickup data 32 or not and content of the photographing condition data 34 (a step S21 in FIG. 12, serving as a data acquisition step). In the present embodiment, particularly "information related to a color filter array of a photographing section used at the time of photographing an image of image data" is used as photographing condition data 34.

The compression parameter determination section 73 determines a compression parameter on the basis of an acquisition result in the data acquisition section 72 (a compression parameter determining step).

That is, in determination of whether or not the photographing condition data 34 is added to the image pickup data 32 (S22), when it is determined that the photographing condition data 34 is not added to the image pickup data 32 (NO at S22), the compression parameter determination section 73 sets "a parameter region α in which a cut ratio of a high frequency component is usual" as a setting selectable range of a compression parameter (S25a). The setting selectable range of a compression parameter described here includes a plurality of selection candidates of the compression parameter, so that a user can select an arbitrary parameter from among the selection candidates as the compression parameter.

On the other hand, if it is determined that the photographing condition data 34 is added to the image pickup data 32 (YES at S22), the compression parameter determination section 73 determines whether an color filter (CF) array used is other than the Bayer array or not on the basis of the photographing condition data 34 (S23).

If it is determined that the array of the color filters is not an array other than the Bayer array (that is, is the Bayer array) (NO at S23), the compression parameter determination section 73 sets "the parameter region α in which a cut ratio of a high frequency component is usual" as the setting selectable range of a compression parameter (S25a).

On the other hand, if it is determined that an array of the color filters is other than the Bayer array (such as a color filter array shown in FIGS. 5B and 6) (YES at S23), the compression parameter determination section 73 determines whether or not to give priority to resolution (S24). Since the user can select whether or not to give priority to resolution, the compression parameter determination section 73 determines whether or not to give priority to resolution on the basis of a selection result by the user. The selection of whether to give priority to resolution or not will be described later (refer to FIGS. 13A and 13B).

If it is determined that resolution is to be given priority (YES at S24), the compression parameter determination section 73 sets "a parameter region β in which a cut ratio of a high frequency component is relatively low" as a setting selectable range of a compression parameter (S25b).

On the other hand, if it is determined that resolution is not to be given priority (NO at S24), the compression parameter determination section 73 sets "a parameter region γ in which a cut ratio of a high frequency component is relatively high" as the setting selectable range of a compression parameter (S25c).

Then, the compression parameter determination section 73 is controlled by the compression control section 71 so as to indicate the set parameter regions α, β, and γ in the display section 55. The display section 55 indicates a compression parameter in a plurality of selection candidates included in the parameter regions α, β, and γ in a selectable manner. Thus, the user can select an arbitrary compression parameter by using the operation section 44 while checking indication in the display section 55 (S26).

The selection result of a compression parameter received through the operation section 44 is transmitted to the compression parameter determination section 73 through the compression control section 71, and the compression parameter determination section 73 decides the compression parameter in accordance with the selection result.

Compression processing sections in subsequent stages (for example, the downsampling processing section 74, the DCT processing section 75, the quantization processing section 76, and the entropy compression processing section 77) apply compression processing to the image photographing data 30 (image pickup data 32) on the basis of the decided compression parameter (S27) to create the compression image data 36 (a compression processing step).

As described above, in accordance with the processing flow of the present embodiment shown in FIG. 12, a range of compression parameters that a user can select is optimized according to presence or absence of photographing condition data 34 and a color filter array, so that the user can easily select an optimum compression parameter. For example, in a case where the photographing condition data 34 is unknown (NO at S22), or in a case where a color filter array is the Bayer array (NO at S23), a usual cut ratio of a high frequency component is set. On the other hand, in a case where the color filter array is an array other than the Bayer array (such as a color filter array in FIGS. 5B and 6) as well as image resolution is to be given priority, a parameter region in which a cut ratio of a high frequency component is relatively low is set as a selectable range of a compression parameter. Accordingly, even if compression processing is applied to the image pickup data 32 of an image with a high frequency component and increased resolution feeling, it is possible to urge a user to select a compression parameter in such a manner that a high frequency component is not excessively removed. As a result, it is possible to effectively perform compression processing without loss of image resolution feeling. On the other hand, in a case where image resolution is not to be given priority, a parameter region in which a cut ratio of a high frequency component is relatively high is set as a selectable range of a compression parameter. Accordingly, it is possible to urge a user to select a compression parameter in such a manner that compression efficiency of image pickup data 32 is increased. As a result, it is possible to effectively perform compression processing with a high compression rate. As described above, adjusting a selectable range of a compression parameter on the basis of a color filter array and priority of resolution results in enabling flexibly meeting user needs of compressing image data in high efficiency while reducing image degradation.

Figure 13A:
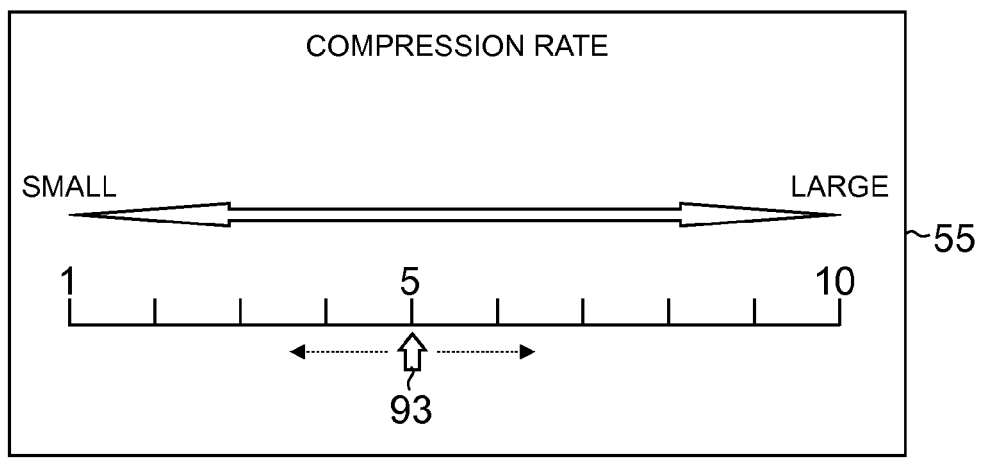
FIG. 13A shows an example of indication of selecting a compression rate/compression level, and an example of a selected compression rate in particular.
Figure 13B:
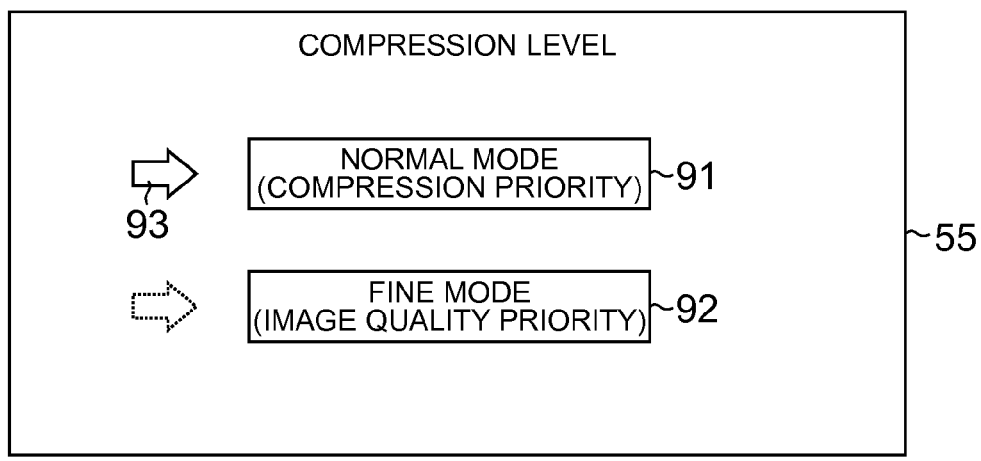
FIG. 13B shows an example of indication of selecting a compression rate/compression level, and an example of a selected compression level in particular.

The setting selectable range of a compression parameter which is to be determined in the compression parameter determination section 73, may be determined according to a compression rate specified by a user. The compression rate described here is based on ratio of the amount of data between before and after compression processing, and directly or indirectly indicates the amount of data that can be compressed. The display section 55 is capable of indicating a compression level from among a plurality of selection candidates in a selectable manner, and the operation section 44 is capable of receiving selection by a user with respect to the compression level. As shown in FIG. 13A, for example, a plurality of levels (FIG. 13A shows 10 levels of "1" to "10", in which a minimum compression rate is indicated as "1" of the 10 levels, and a maximum compression rate is indicated as "10") of extent of compression (such as a compression rate and a compression level) are prepared so that a user can select an arbitrary compression level by operating a cursor 93 through the operation section 44. In that case, the compression parameter determination section 73 is controlled by the compression control section 71 so as to determine a setting selectable range of a compression parameter on the basis of the compression level (compression rate) selected by the user. The user may specify a compression rate before photographing an image of the image pickup data 32, after photographing an image of the image pickup data 32, or during compression processing.

The user also can select priority on resolution, and the user may set the priority on resolution in advance before photographing an image of the image pickup data 32, after photographing the image of the image pickup data 32, or during compression processing. For example, the user operates the operation section 44 to allow the cursor 93 to point to any one of normal mode (priority on compression size) indication 91 and fine mode (priority on image quality) indication 92 indicated in the display section 55 as described in FIG. 13B so that the user can select the normal mode or the fine mode. If the normal mode is selected, it is determined that "resolution is not given priority" (NO at S24 in FIG. 12), and if the fine mode is selected, it is determined that "resolution is given priority" (YES at S24).

An arbitrary parameter corresponding to compression processing can serve as the compression parameter. In the case of compression processing using a JPEG format, for example, a downsampling ratio and a quantization step value (quantization parameter) of a quantization table can serve as the compression parameter.

Thus, if it is determined that color filters having an array structure in which a high frequency component of the image pickup data 32 relatively increases, as with the color filter array shown in FIGS. 5B and 6 for example, are used (YES at S23), the compression processing can be performed also in a state where the compression parameter determination section 73 changes the compression parameter in such a manner that as for the luminance signal, it is changed to a quantization parameter (a settable range of a parameter) for increasing the ratio of components in a high frequency region (that is, a quantization parameter for reducing a ratio of cutting components in the high frequency region) while as for the color difference signal, it is changed to a quantization parameter (a settable range of a parameter) for reducing ratio of components in a high frequency region (that is, a quantization parameter for increasing a ratio of cutting components in the high frequency region). As a result, it is possible to acquire a compression image with a relatively high compression rate while degradation of image quality is reduced.

Second Embodiment

Figure 14:
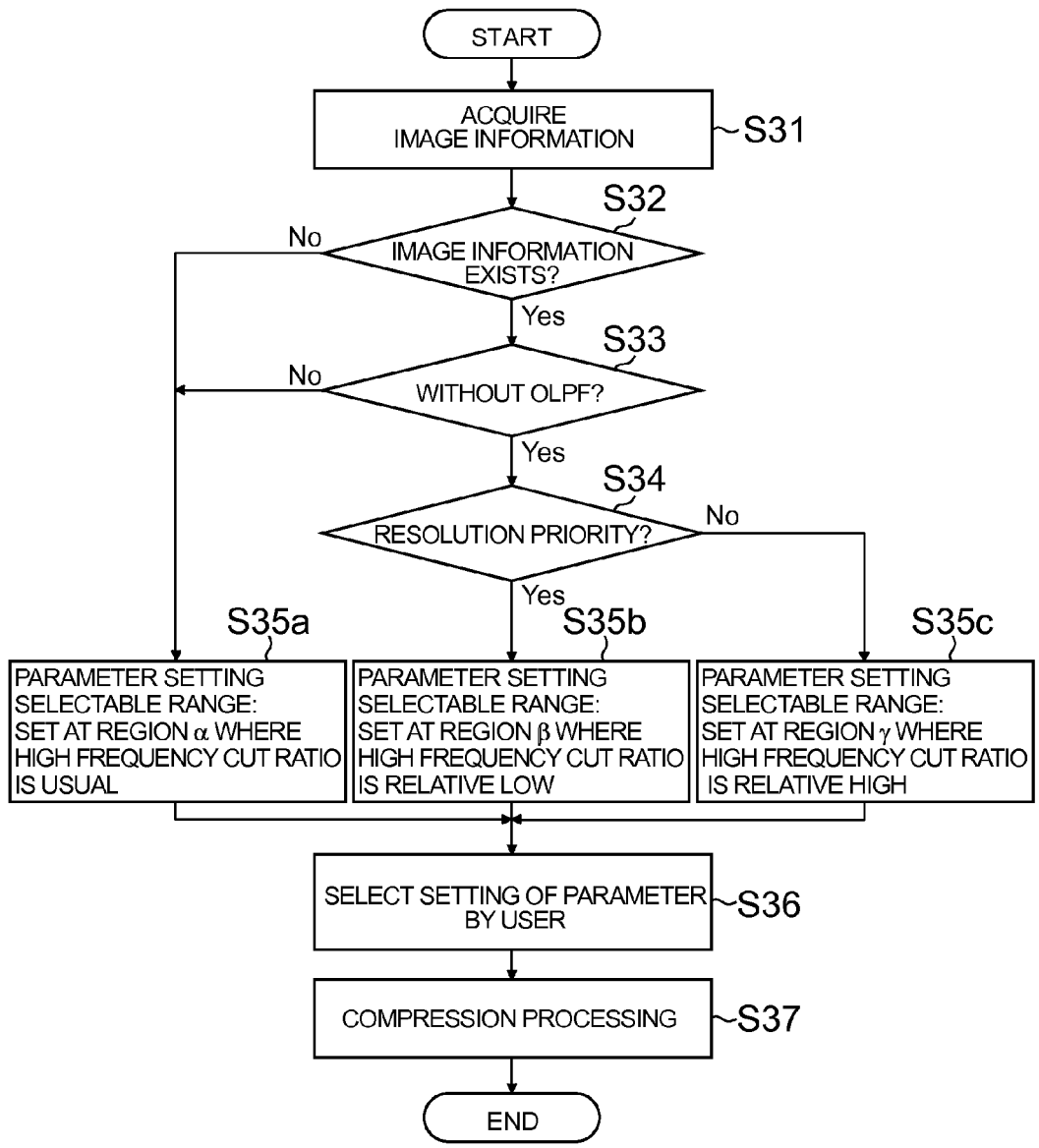
FIG. 14 is a flow chart of determining a compression parameter in accordance with a second embodiment.

An example of compression processing in accordance with a second embodiment will be described with reference to FIGS. 11 and 14. FIG. 14 is a flow chart of determining a compression parameter in accordance with the second embodiment.

In the present embodiment, detailed descriptions of processing identical with or similar to the first embodiment described above are omitted.

The present embodiment allows a user to easily select an optimum compression parameter by optimizing a selectable range of a compression parameter depending on presence or absence of an optical low-pass filter. Thus, while, in the first embodiment, "information related to the color filter array of a photographing section used at the time of photographing an image of image data" is used as the photographing condition data 34, in the present embodiment, "information related to the presence or absence of an optical low-pass filter at the time of photographing an image of image data" is used as the photographing condition data 34.

Since processing steps S31 to S37 in FIG. 14 in accordance with the second embodiment are identical with processing steps S21 to S27 in FIG. 12 in accordance with the first embodiment except that the "determination processing of a color filter array (S23 in FIG. 12)" in the first embodiment is replaced with "determination processing of presence or absence of an optical low-pass filter (S33 in FIG. 14)", detailed descriptions of processing common to both embodiments are omitted.

In the present embodiment, as with the first embodiment, when the image compression processing section 89 receives the image photographing data 30, the data acquisition section 72 acquires the photographing condition data 34 (the step S31 in FIG. 14), and the compression parameter determination section 73 determines whether or not the photographing condition data 34 is added to the image pickup data 32 (S32). If it is determined that the photographing condition data 34 is not added (NO at S32), "a parameter region α in which a cut ratio of a high frequency component is usual" is set as a setting selectable range of a compression parameter (S35a).

If it is determined that the photographing condition data 34 is added to the image pickup data 32 (YES at S32), the compression parameter determination section 73 determines whether there is an optical low-pass filter (OLPF) or not on the basis of the photographing condition data 34 (S33). If it is determined that the optical low-pass filter has been used at the time of photographing an image of the image pickup data 32 (NO at S33), the compression parameter determination section 73 sets "the parameter region α in which a cut ratio of a high frequency component is usual" as the setting selectable range of a compression parameter (S35a).

On the other hand, if it is determined that the optical low-pass filter is not used at the time of photographing an image of the image pickup data 32 (YES at S33), the compression parameter determination section 73 determines whether to give priority to resolution or not (S34).

The steps of setting a setting selectable range of a compression parameter according to the determined result of resolution (S35b and S35c), and performing compression processing (S37) by using a compression parameter selected by a user (S36), are identical with those of the first embodiment.

As described above, in accordance with the processing flow of the present embodiment shown in FIG. 14, a range of compression parameters that a user can select is optimized according to presence or absence of photographing condition data 34 and presence or absence of an optical low-pass filter, so that the user can easily select an optimum compression parameter. In particular, in a case where a photographing section in which an optical low-pass filter is not provided photographs an image of the image pickup data 32 and priority is given to resolution, it is possible to urge a user to select a compression parameter such that a high frequency component included in the image pickup data 32 is not excessively removed. As a result, it is possible to effectively perform compression processing without loss of image resolution feeling.

Third Embodiment

Figure 15:
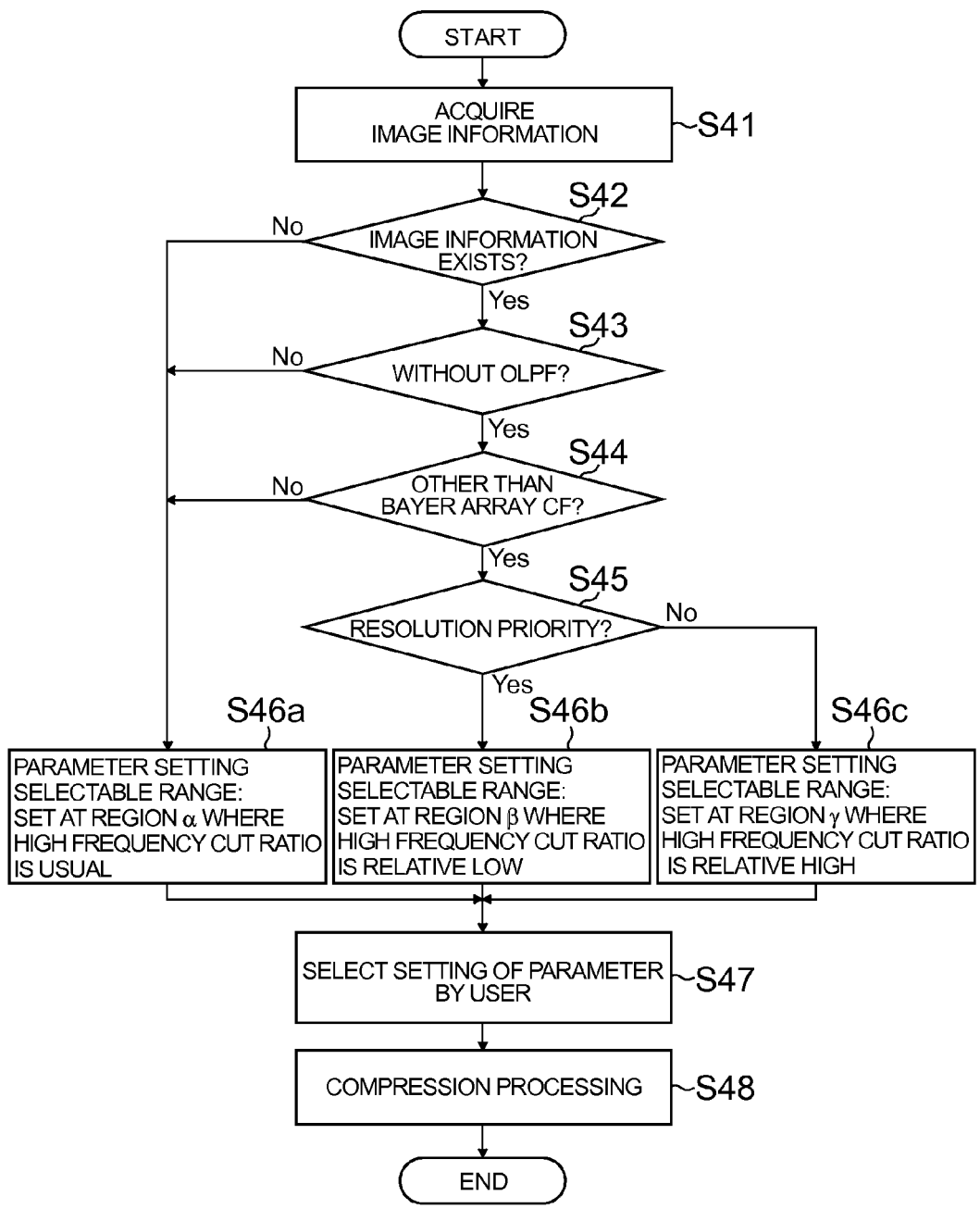
FIG. 15 is a flow chart of determining a compression parameter in accordance with a third embodiment.

An example of compression processing in accordance with a third embodiment will be described with reference to FIGS. 11 and 15. FIG. 15 is a flow chart of determining a compression parameter in accordance with the third embodiment.

In the present embodiment, detailed descriptions of processing identical with or similar to the first embodiment or the second embodiment described above are omitted.

A selectable range of a compression parameter is optimized with reference to a "color filter array" in the first embodiment (refer to FIG. 12), and with reference to "presence or absence of an optical low-pass filter" in the second embodiment (refer to FIG. 14), but with reference to both the "color filter array" and the "presence or absence of an optical low-pass filter" in the present embodiment.

Since processing steps S41 to S48 in FIG. 15 in accordance with the third embodiment are based on combination of the processing flow of the first embodiment (S21 to S27 in FIG. 12) and the processing flow (S31 to S37 in FIG. 14) of the second embodiment, content of each individual processing step is basically the same. Thus, detailed descriptions related to common processing contents are omitted.

In the present embodiment, as with the first embodiment and the second embodiment, when the image compression processing section 89 receives the image photographing data 30, the data acquisition section 72 acquires the photographing condition data 34 (the step S41 in FIG. 15), and then the compression parameter determination section 73 determines whether or not the photographing condition data 34 is added to the image pickup data 32 (S42). If it is determined that the photographing condition data 34 is not added (NO at S42), "a parameter region α in which a cut ratio of a high frequency component is usual" is adopted as a setting selectable range of a compression parameter (S46a).

If it is determined that the photographing condition data 34 is added to the image pickup data 32 (YES at S42), the compression parameter determination section 73 determines whether or not there is an optical low-pass filter (OLPF). If it is determined that the optical low-pass filter is used at the time of photographing an image of the image pickup data 32 (NO at S43), the compression parameter determination section 73 sets "the parameter region α in which a cut ratio of a high frequency component is usual" as the setting selectable range of a compression parameter (S46a).

On the other hand, if it is determined that the optical low-pass filter is not used at the time of photographing an image of the image pickup data 32 (YES at S43), the compression parameter determination section 73 determines whether an color filter array (CF) used is other than the Bayer array or not (S44).

If it is determined that the array of the color filters is not an array other than the Bayer array (namely, is the Bayer array) (NO at S44), the compression parameter determination section 73 sets "the parameter region α in which a cut ratio of a high frequency component is usual" as the setting selectable range of a compression parameter (S46a).

On the other hand, if it is determined that the array of the color filters is an array other than the Bayer array (such as a color filter array shown in FIGS. 5B and 6) (YES at S44), the compression parameter determination section 73 determines whether to give priority to resolution or not (S45).

The steps of setting a setting selectable range of a compression parameter according to the determined result of resolution (S46b and S46c), and performing compression processing by using a compression parameter selected (S47) by a user (S48), are identical with steps of the first and second embodiments.

As described above, in accordance with the processing flow of the present embodiment shown in FIG. 15, a range of a compression parameter that a user can select is optimized according to presence or absence of photographing condition data 34, presence or absence of an optical low-pass filter, and the color filter array, so that the user can easily select an optimum compression parameter.

Fourth Embodiment

Figure 16:
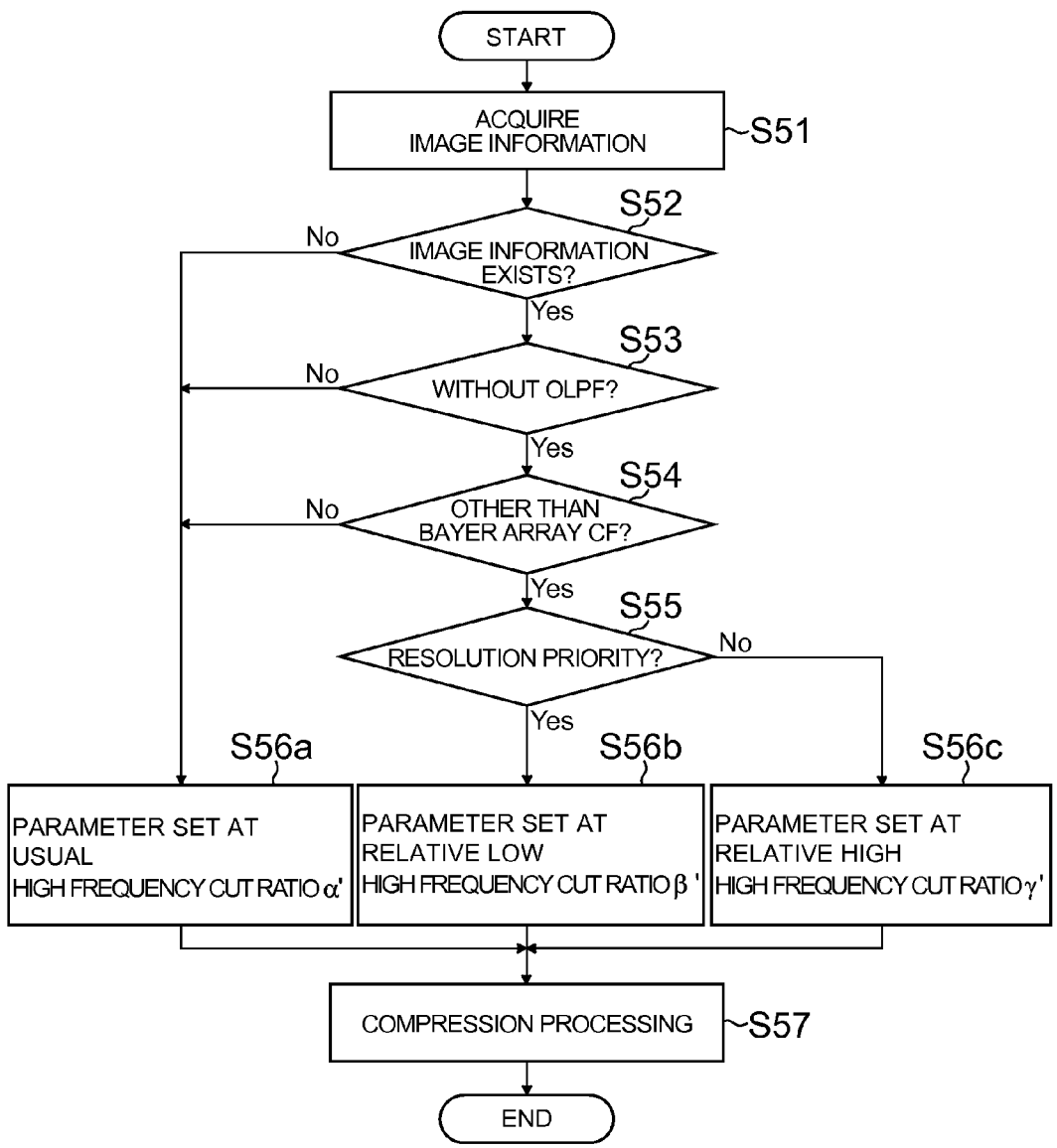
FIG. 16 is a flow chart of determining a compression parameter in accordance with a fourth embodiment.

An example of compression processing in accordance with a fourth embodiment will be described with reference to FIGS. 11 and 16. FIG. 16 is a flow chart of determining a compression parameter in accordance with the fourth embodiment.

In the present embodiment, detailed descriptions of processing identical with or similar to the third embodiment described above are omitted.

While, in the third embodiment described above, compression processing is performed on the basis of a compression parameter selected from a prescribed range including a plurality of selection candidates by a user, in the present embodiment, a compression parameter is automatically determined in accordance with photographing condition data without indicating a plurality of selection candidates to a user.

Of processing steps S51 to S57 in FIG. 16 based on the fourth embodiment, detailed descriptions of processing steps common to the processing step (S41 to S48 in FIG. 15) of the third embodiment are omitted.

In the present embodiment, as with the third embodiment, when the image compression processing section 89 receives the image photographing data 30, the data acquisition section 72 acquires the photographing condition data 34 (the step S51 in FIG. 16), and the compression parameter determination section 73 determines whether or not the photographing condition data 34 is added to the image pickup data 32 (S52). If it is determined that the photographing condition data 34 is not added (NO at S52), the compression parameter determination section 73 sets a "parameter α' in which a cut ratio of a high frequency component is usual" as the compression parameter (S56a).

If it is determined that the photographing condition data 34 is added (YES at S52) and that the optical low-pass filter is used at the time of photographing an image of the image pickup data 32 (NO at S53), the compression parameter determination section 73 sets the "parameter α' in which a cut ratio of a high frequency component is usual" as the compression parameter (S56a).

If it is determined that the optical low-pass filter is not used at the time of photographing an image of the image pickup data 32 (YES at S53) and that an color filter array is the Bayer array (NO at S54), the compression parameter determination section 73 also sets the "parameter α' in which a cut ratio of a high frequency component is usual" as the compression parameter (S56a).

On the other hand, if it is determined that the array of the color filters is an array other than the Bayer array (such as a color filter array shown in FIGS. 5B and 6) (YES at S54), the compression parameter determination section 73 determines whether to give priority to resolution or not (S55).

If it is determined that resolution is to be given priority (YES at S55), the compression parameter determination section 73 sets "a parameter β' in which a cut ratio of a high frequency component is relatively low" as a compression parameter (S56b). In addition, if it is determined that resolution is not to be given priority (NO at S55), the compression parameter determination section 73 sets "a parameter γ' in which a cut ratio of a high frequency component is relatively high" as a compression parameter (S56c).

Compression processing sections in subsequent stages (for example, the downsampling processing section 74, the DCT processing section 75, the quantization processing section 76, and the entropy compression processing section 77) apply compression processing to the image photographing data 30 (image pickup data 32) on the basis of the set compression parameters α', β', and γ' (S57).

As described above, in accordance with the processing flow of the present embodiment shown in FIG. 16, an optimum compression parameter is automatically set according to presence or absence of photographing condition data, presence or absence of an optical low-pass filter, and a color filter array, so that effective compression processing with reducing image degradation can be performed.

In a case where an optimum compression parameter is automatically set on the basis of the photographing condition data 34 as with the present example, the compression parameter determination section 73 may allow the display section 55 to indicate the set compression parameter before compression processing so as to urge a user to accept (decide) the setting. In that case, the user operates the operation section 44 to accept (decide) the set compression parameter. Thus, if the set compression parameter "increases the ratio of luminance signals and reduces the ratio of color difference signals in the JPEG compression processing", that fact may be indicated (warning notification) on the display section 55 to urge a user to accept (decide) the compression parameter.

In addition, in the embodiment described above, although the compression parameter is set on the basis of both of information on "presence or absence of an optical low-pass filter" and information on "a color filter array", the compression parameter may be set on the basis of only any one of the information on "presence or absence of an optical low-pass filter" and the information on "a color filter array". In a case where a compression parameter is set on the basis of only information on "presence or absence of an optical low-pass filter", for example, if it is determined that an optical low-pass filter is not used (YES at S53), it is determined whether resolution is given priority or not (S55). Likewise, in a case where a compression parameter is set on the basis of only information on "a color filter array", if it is determined that there is photographing condition data 34 (YES at S52), it is determined whether the color filter array is the Bayer array or not (S54).

Fifth Embodiment

Figure 17:
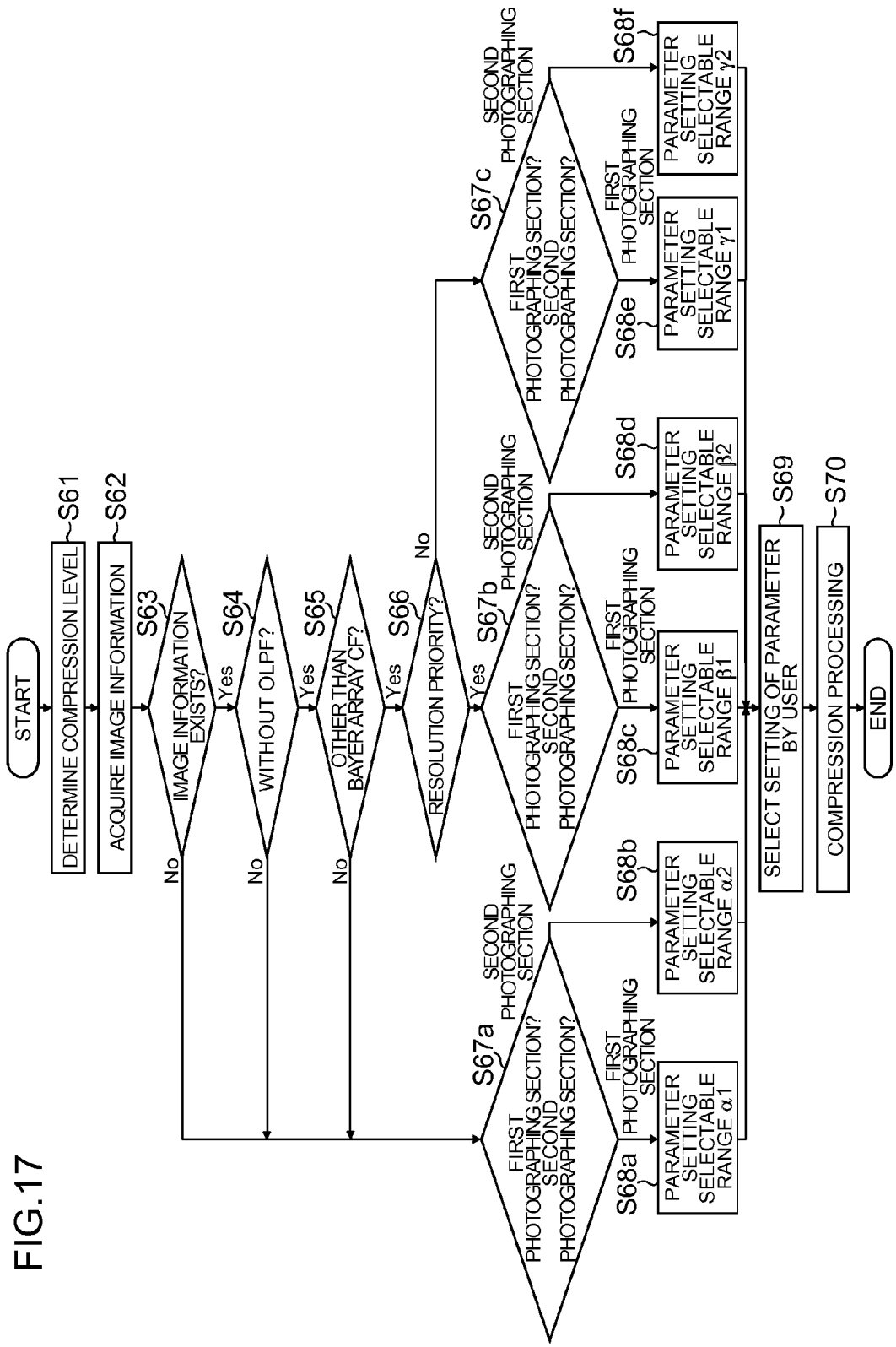
FIG. 17 is a flow chart of determining a compression parameter in accordance with a fifth embodiment.

An example of compression processing in accordance with a fifth embodiment will be described with reference to FIGS. 11 and 17. FIG. 17 is a flow chart of determining a compression parameter in accordance with the fifth embodiment.

In the present embodiment, detailed descriptions of processing identical with or similar to the third embodiment described above are omitted.

In the present embodiment, an example where image pickup data (image data) 32 of images photographed by a plurality of photographing sections (first and second photographing sections) is inputted to the image processing section 14 (image compression processing section 89) will be described. In particular, in an example below, a user selects a compression level (refer to FIGS. 13A and 13B) from among a plurality of selection candidates and a compression parameter with respect to the image pickup data 32 of an image photographed by each of the photographing sections is determined by using the selected compression level and the photographing condition data 34.

In the present embodiment, first a user determines a desired compression level (step S61 in FIG. 17). A method of selecting a compression level is not limited in particular, and therefore a user selects an arbitrary compression level (a normal mode (where compression is given to priority) or a fine mode (where image quality is given to priority)) through the operation section 44 on the basis of the indication in FIG. 13B, for example.

Then, the data acquisition section 72 acquires the photographing condition data 34 (S62), and the compression parameter determination section 73 determines whether or not the photographing condition data 34 is added to the image pickup data 32 (S63).

If it is determined that the photographing condition data 34 is not added (NO at S63), the compression parameter determination section 73 determines which of the first and second photographing sections has photographed an image of the image pickup data 32 of a processing object (S67a). The photographing condition data 34 of the present embodiment includes information capable of identifying characteristics of a photographing section that acquires the image data, in addition to information related to presence or absence of an optical low-pass filter and information related to a color filter array. The compression parameter determination section 73 can determine which of the first and second photographing sections has photographed an image of the image pickup data 32, on the basis of the "information capable of identifying characteristics of a photographing section". The "information capable of identifying characteristics of a photographing section" is not limited in particular, and therefore arbitrary information reflecting photographing performance of the first and second photographing sections may be adopted as the "information capable of identifying characteristics of a photographing section".

If it is determined that the first photographing section has photographed the image, the compression parameter determination section 73 sets "a parameter region $\alpha 1$ in which a cut ratio of a high frequency component is relatively low" as a setting selectable range of a compression parameter (S68a). On the other hand, if it is determined that the second photographing section has photographed the image, the compression parameter determination section 73 sets "a parameter region $\alpha 2$ in which a cut ratio of a high frequency component is relatively low" as the setting selectable range of a compression parameter (S68b).

At this step, the set setting selectable range of a compression parameter is determined on the basis of both of a selected "compression level" and "characteristics of each of the photographing sections". That is, the compression parameter determination section 73 determines a setting selectable range $\alpha 1$ of a compression parameter with respect to the image pickup data 32 of an image photographed by the first photographing section, on the basis of the acquisition result of the photographing condition data 34 with respect to the image pickup data 32 of the image photographed by the first photographing section and the selection result of a compression level received through the operation section 44. Likewise, the compression parameter determination section 73 determines a setting selectable range $\alpha 2$ of a compression parameter with respect to the image pickup data 32 of an image photographed by the second photographing section, on the basis of the acquisition result of the photographing condition data 34 with respect to the image pickup data 32 of the image photographed by the second photographing section and the selection result of a compression level received through the operation section 44.

Thus, even if compression levels selected by a user are the same, a setting selectable range of a compression parameter may be different when a photographing section (such as an imaging element (sensor)) that has photographed an image of the image pickup data 32 is different. As above, in the present embodiment, a setting selectable range of a compression parameter is determined in consideration of not only a compression level but also characteristics of a photographing section.

Likewise, in a case where it is determined that the photographing condition data 34 is added to the image pickup data 32 (YES at S63) and that "an optical low-pass filter has been used at the time of photographing an image of the image pickup data 32 (NO at S64)", and also in a case where it is determined that an optical low-pass filter is not used at the time of photographing the image of the image pickup data 32 (YES at S64) and that "a color filter array is the Bayer array (NO at S65)", a setting selectable range of a compression parameter is set at the "parameter region $\alpha 1$" or the "parameter region $\alpha 2$" through the step S67a described above (S68a and S68b).

On the other hand, if it is determined that the array of the color filters is an array other than the Bayer array (such as a color filter array shown in FIGS. 5B and 6) (YES at S65), the compression parameter determination section 73 determines whether to give priority to resolution or not (S66).

If it is determined that resolution is given priority (a fine mode) (YES at S66), the compression parameter determination section 73 determines which of the first and second photographing sections has photographed an image of the image pickup data 32 of the processing object (S67b). In a case where the first photographing section has photographed the image, the setting selectable range of a compression parameter is set at a "parameter region $\beta 1$" (S68c), and in a case where the second photographing section has photographed the image, the setting selectable range of a compression parameter is set at a "parameter region $\beta 2$" (S68d).

If it is determined that resolution is not given priority (a normal mode) (NO at S66), the compression parameter determination section 73 determines which of the first and second photographing sections has photographed an image of the image pickup data 32 of the processing object (S67c). In a case where the first photographing section has photographed the image, the setting selectable range of a compression parameter is set at a "parameter region $\gamma 1$" (S68e), and in a case where the second photographing section has photographed the image, the setting selectable range of a compression parameter is set at a "parameter region $\gamma 2$" (S68f).

The compression parameter determination section 73 is controlled by the compression control section 71 so as to allow the display section 55 to indicate the set parameter region $\alpha 1$, $\alpha 2$, $\beta 1$, $\beta 2$, $\gamma 1$, or $\gamma 2$. Thus, the user can select an arbitrary compression parameter by using the operation section 44 while checking indication on the display section 55 (S69).

The selection result of a compression parameter received through the operation section 44 is transmitted to the compression parameter determination section 73 through the compression control section 71, and the compression parameter determination section 73 decides the compression parameter in accordance with the selection result.

Then, compression processing sections in subsequent stages (for example, downsampling processing section 74, the DCT processing section 75, the quantization processing section 76, and the entropy compression processing section 77) apply compression processing to each of the image pickup data 32 of an image photographed by the first photographing section and the image pickup data 32 of an image photographed by the second photographing section on the basis of the decided compression parameter (S70).

As described above, in accordance with the processing flow of the present embodiment shown in FIG. 17, an optimum setting selectable range of a compression parameter is determined according to characteristics of each of photographing sections that has photographed an image of the image pickup data 32 in addition to presence or absence of photographing condition data, presence or absence of an optical low-pass filter and a color filter array, so that the user can easily select an optimum compression parameter.

In addition, a plurality of image pickup apparatuses (the first photographing section and the second photographing section) may be assembled in the same apparatus or in different apparatuses.

In a case where a plurality of image pickup apparatuses are assembled in the same apparatus, the apparatus can be configured to adopt the configuration of the first photographing section 12A and the second photographing section 12B shown in FIG. 1B, for example. On the other hand, in a case where a plurality of image pickup apparatuses are assembled in different apparatuses, the apparatuses can be configured in such a manner that a plurality of photographing units 10" are connected to the computer 11 as shown in FIG. 1C, for example.

In addition, the present embodiment is applicable to a camera of an interchangeable sensor type including a photographing unit which can be exchanged and selected from among a plurality of photographing sections including at least a first photographing section and a second photographing section, and it is possible to perform an optimum compression processing according to an assembled photographing section (presence or absence of an optical low-pass filter/a color filter array).

Preferable embodiments of the present invention are described above; however, the present invention is not limited to the embodiments described above, but is also appropriately applicable to other embodiments.

Although, in the above embodiments, an example in which the compression parameter determination section 73 determines whether the array of color filters (CF) is an array other than the "Bayer array" or not is described (refer to S23 in FIG. 12, S44 in FIG. 15, S54 in FIG. 16, and S65 in FIG. 17), color filters used may be determined with reference to another color filter array. For example, the compression parameter determination section 73 may determine whether the array of color filters (CF) used in a photographing section that is used at the time of photographing an image of image data is an array other than the "color filter array shown in FIGS. 5B and 6" or not on the basis of the photographing condition data 34.

As described above, the "color filter array shown in FIGS. 5B and 6" includes a predetermined basic array pattern in which G-filters (first filters) corresponding to green (first color) that most contributes to acquiring a luminance signal and R-filters and B-filters (second filters) corresponding to second colors of two or more colors other than green (red and blue (a first constituent color and a second constituent color) in the illustrated example) are arranged. The basic array pattern is repeatedly arranged in a horizontal direction (first direction) and a vertical direction (second direction); a G-filter is arranged in each of lines in the horizontal direction, the vertical direction, and an oblique direction (third direction) inclined at 45° to the horizontal and vertical directions of the color filter array; one or more second filters (R-filter and B-filter) are arranged in each of lines in the horizontal direction and in the vertical direction of the color filter array in the basic array pattern; and the ratio of the pixel number of green corresponding to the G-filter is larger than the ratio of the pixel number of each color of the second colors (red and blue) corresponding to the R-filter and the B-filter. The color filter array includes a part where two or more pixels of G-filters continue in each of lines in the horizontal direction, the vertical direction, and the oblique direction. In addition, in the color filter array, G-filters are arranged at a center and four corners in a 3×3 pixel group, and the 3×3 pixel group is repeatedly arranged in the horizontal direction and in the vertical direction. More particularly, the basic array pattern is a square array pattern corresponding to 6×6 pixels, and also the color filter array includes a first array and a second array being alternately arranged in the horizontal direction and in the vertical direction, the first array corresponding to 3×3 pixels in which G-filters are arranged at a center and four corners, R-filters corresponding to red are arranged in such a manner that the G-filter at the center is positioned between the R-filters in the horizontal direction and B-filters corresponding to blue are arranged in such a manner that the G-filter at the center is positioned between the B-filters in the vertical direction, the second array corresponding to 3×3 pixels in which G-filters are arranged at a center and four corners, R-filters corresponding to red are arranged in such a manner that the G-filter at the center is positioned between the R-filters in the vertical direction and B-filters corresponding to blue are arranged in such a manner that the G-filter at the center is positioned between the B-filters in the horizontal direction.

As above, photographing condition data to be added to image data to be inputted may include information related to a color filter array of a photographing section used at the time of photographing an image of the image data, and information related to whether the color filter of the photographing section used at the time of photographing the image of the image data is the color filter shown in FIGS. 5B and 6 or not may be used as the "information related to a color filter array" described above. In an image photographed with an image pickup apparatus using a conventional Bayer array without an optical low-pass filter, a color filter array of the image pickup apparatus may cause a false color and color moire depending on a subject. In that case, even if a compression parameter is changed for image data including the false color, the color moire, and the like, it is impossible to obtain a sufficient effect on image quality with respect to compression image. On the other hand, according to an image pickup apparatus using the color filter array shown in FIGS. 5B and 6 without an optical low-pass filter, it is possible to prevent a false color and color moire to acquire an image of high picture quality with high resolution, and therefore, changing a compression parameter greatly affects image quality. Thus, in a case where information related to whether a color filter is the color filter shown in FIGS. 5B and 6 or not is used as the "information related to a color filter array", it is possible to compress image data while maintaining high picture quality by adjusting a compression parameter.

Accordingly, if it is determined that the color filter used is the color filter shown in FIGS. 5B and 6 (or further if it is determined that resolution is given priority), the compression parameter determination section 73 may adopt "a parameter region in which a cut ratio of a high frequency component is relatively low" as a setting selectable range of a compression parameter. On the other hand, if it is determined that the color filter used is the color filter shown in FIGS. 5B and 6 but it is determined that resolution is not given priority, the compression parameter determination section 73 may adopt "a parameter region in which a cut ratio of a high frequency component is relatively high" as the setting selectable range of a compression parameter. In addition, if it is determined that the color filter used is not the color filter shown in FIGS. 5B and 6, the compression parameter determination section 73 may adopt "a parameter region in which a cut ratio of a high frequency component is usual" as the setting selectable range of a compression parameter.

Although a digital camera is described in the embodiments described above (refer to FIG. 4), a configuration of the image pickup apparatus is not limited to the digital camera. The present invention is applicable to other image pickup apparatuses, such as a built-in or an external PC camera, or a portable terminal device having a photographing function such as described below. In addition, the embodiments described above are also applicable to a computer, and the present invention is also applicable to a program that allows a computer to execute each of the processing steps described above. In a case where the present invention is applied to a computer and a program, when RAW data and the like are edited on the computer, it is possible to clearly indicate an optimum compression parameter to a user so that the user can easily determine an optimum compression parameter. As a result, it is possible to provide a user interface capable of optimally editing an image.

Portable terminal devices of one of embodiments of an image pickup apparatus according to the present invention include a cellular phone, a smartphone, a personal digital assistant (PDA), and a portable type game machine, for example. Hereinafter, a smartphone will be described in detail as an example with reference to drawings.

Figure 18:
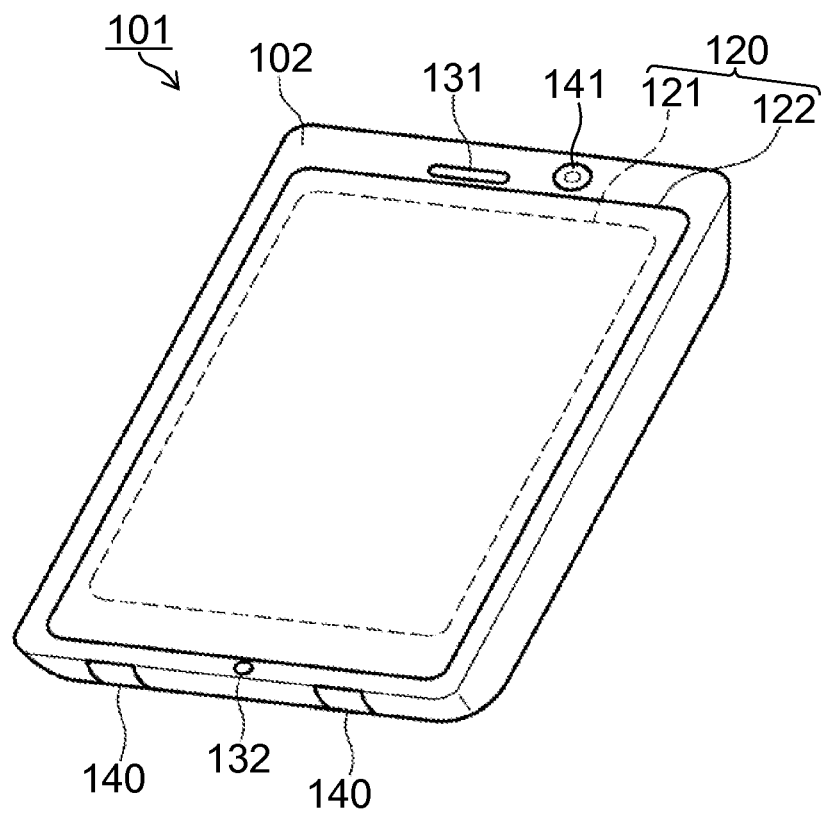
FIG. 18 is an external view of a smartphone of one embodiment of an image pickup apparatus of the present invention.
Figure 19:
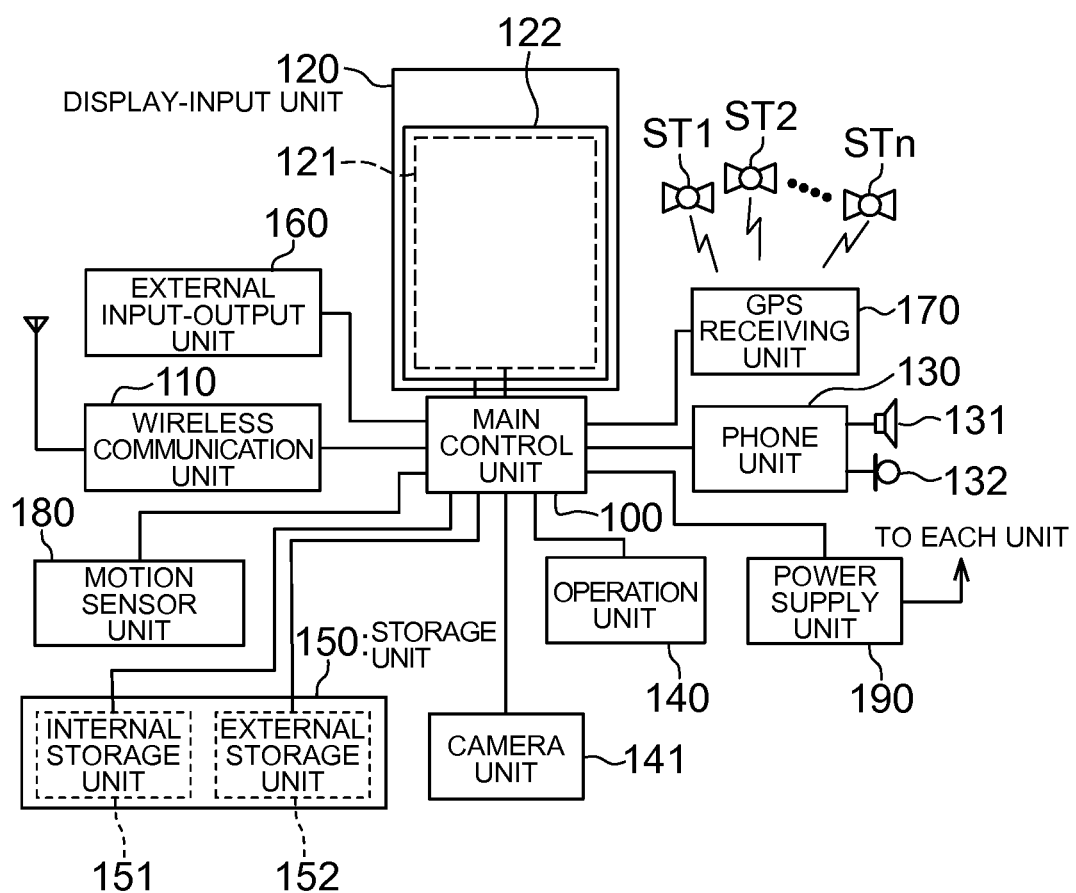
FIG. 19 is a block diagram showing a configuration of the smartphone shown in FIG. 18.

FIG. 18 shows appearance of a smartphone 101 of one of embodiments of the image pickup apparatus of the present invention. The smartphone 101 shown in FIG. 18 has a tabular body 102 that is provided in its one face with a display-input unit 120 into which a display panel 121 serving as a display and an operation panel 122 serving as an input section are integrated. In addition, the body 102 includes a speaker 131, a microphone 132, an operation unit 140, and a camera unit 141. A configuration of the body 102 is not limited to the above, so that it is possible to apply a configuration in which a display and an input section are separated, a foldable structure, or a configuration having a slide mechanism, for example, FIG. 19 is a block diagram showing a configuration of the smartphone 101 shown in FIG. 18. As shown in FIG. 19, the smartphone includes the following as main components: a wireless communication unit 110; a display-input unit 120; a phone unit 130; an operation unit 140; an camera unit 141; a storage unit 150; an external input-output unit 160; a global positioning system (GPS) receiving unit 170; a motion sensor unit 180; a power supply unit 190; and a main control unit 100. In addition, the smartphone 101 has a wireless communication function of performing mobile wireless communication through a base station device BS and a mobile communication network NW, as a main function.

The wireless communication unit 110 performs wireless communication with respect to the base station device BS installed in the mobile communication network NW in accordance with an instruction of the main control unit 100. The wireless communication is used to transmit and receive various file data such as voice data and image data, and electronic mail data, and to receive Web data and streaming data.

The display-input unit 120 is so-called a touch panel that displays an image (a still image and a dynamic image), character information, and the like, by control of the main control unit 100 to visually transmit information to a user, as well as detects a user operation with respect to the displayed information, the display-input unit 120 including the display panel 121 and the operation panel 122.

The display panel 121 uses a Liquid Crystal Display (LCD), an Organic Electro-Luminescence Display (OELD), and the like, as a display device. The operation panel 122 is a device that is mounted so that an image displayed in a screen of the display panel 121 is visible, and that detects one or more coordinates by operation with a finger of a user or a stylus. When the device is operated with a finger of a user or a stylus, a detection signal caused by the operation is outputted to the main control unit 100. The main control unit 100 then detects an operation position (coordinate) on the display panel 121 on the basis of the received detection signal.

As shown in FIG. 18, the display panel 121 and the operation panel 122 of the smartphone 101, illustrated as one of embodiments of the image pickup apparatus of the present invention, integrally constitute the display-input unit 120 in which the display panel 121 is arranged so as to be completely covered with the operation panel 122. In a case where the arrangement above is applied, the operation panel 122 may include a function of detecting a user operation in an area outside the display panel 121. That is, the operation panel 122 may include a detection area (hereinafter referred to as a display area) for an overlapping portion overlapped with the display panel 121, and a detection area (hereinafter referred to as a non-display area) for an outer periphery other than the display area, which outer periphery does not overlap with the display panel 121.

A size of the display area may correspond with a size of the display panel 121; however, it is unnecessary to allow both sizes to correspond with each other. In addition, the operation panel 122 may include two sensitive areas of an outer periphery and an inside area other than the outer periphery. Further, a width of the outer periphery can be appropriately designed depending on a size of the body 102 and the like. Furthermore, any one of a matrix switch method, a resistive film method, a surface elastic wave method, an infrared ray method, an electromagnetic induction method, and a capacitance method, is applicable to the operation panel 122 as a position detection method.

The phone unit 130 includes the speaker 131 and the microphone 132, and converts voice of a user received through the microphone 132 into voice data that can be processed in the main control unit 100 to output the voice data to the main control unit 100, as well as decodes voice data received by the wireless communication unit 110 or the external input-output unit 160 to output the voice data from the speaker 131. In addition, as shown in FIG. 18, it is possible to mount the speaker 131 on a face in which the display input unit 120 is provided, and mount the microphone 132 in a side face of the body 102, for example.

The operation unit 140 is a hardware key using a key switch and the like, and receives an instruction from a user. As shown in FIG. 18, for example, the operation unit 140 is mounted on a side face of the body 102 of the smartphone 101, and is a push button switch that is turned on when pressed with a finger and that is turned off by restoring force of a spring and the like when the finger is removed.

The storage unit 150 stores the following: a control program and control data of the main control unit 100; an application software; address data in which names of communications partners are correlated with telephone numbers, and the like; data of electronic mails that are transmitted and received; Web data downloaded by Web browsing; and content data that is downloaded, as well as temporarily stores streaming data and the like. In addition, the storage unit 150 is composed of an internal storage unit 151 built in the smartphone and an external storage unit 152 having an external memory slot to which an external storage is detachable. Further, each of the internal storage unit 151 and the external storage unit 152, which constitute the storage unit 150, is realized by using a storage medium, such as a flash memory type, a hard disk type, a multimedia card micro type, a card type memory (such as a Micro SD (registered trademark) memory), a random access memory (RAM), and a read only memory (ROM).

The external input-output unit 160 serves as an interface with all external apparatuses to be connected to the smartphone 101 so that the smartphone directly or indirectly connects to another external apparatus through communication (such as universal serial bus (USB), and IEEE1394) or a network (such as the Internet, a wireless LAN, Bluetooth (registered trademark), Radio Frequency Identification (RFID), Infrared Data Association (IrDA: registered trademark), Ultra Wideband (UWB: registered trademark), and ZigBee (registered trademark).

The smartphone 101 is connected to an external apparatus, such as: a wired/wireless headset; a wired/wireless external charger; a wired/wireless data port; a memory card, a Subscriber Identity Module (SIM) Card/, and an User Identity Module (UIM) Card, which are to be connected through the card socket; an external audio/video apparatus to be connected through an audio/video Input/Output (I/O) terminal, an external audio/video apparatus to be connected with wireless connection; a smartphone to be connected with wired/wireless connection; a personal computer to be connected with wired/wireless connection; a PDA to be connected with wired/wireless connection; and an earphone to be connected with wired/wireless connection. The external input-output unit is capable of transmitting data transmitted from external apparatuses as described above to each of components in the smartphone 101, as well as capable of allowing data in the smartphone 101 to be transmitted to the external apparatuses.

The GPS receiving unit 170 receives GPS signals transmitted from GPS satellites ST1 to STn in accordance with an instruction of the main control unit 100 to perform positioning calculation processing based on the received GPS signals, thereby detecting a position of the smartphone 101, defined by a latitude, a longitude, and an altitude. In a case where location information can be acquired from the wireless communication unit 110 and the external input-output unit 160 (such as a wireless LAN), the GPS receiving unit 170 also can detect a position of the smartphone 101 by using the location information.

The motion sensor unit 180 includes a triaxial acceleration sensor and the like, for example, to detect a physical motion of the smartphone 101 in accordance with an instruction of the main control unit 100. The physical motion of the smartphone 101 is detected so that a direction and acceleration of the motion of the smartphone 101 are detected. The detection result above is to be outputted to the main control unit 100.

The power supply unit 190 supplies electric power stored in a battery (not shown) to each of units of the smartphone 101 in accordance with an instruction of the main control unit 100.

The main control unit 100 includes a microprocessor and operates in accordance with a control program and control data stored in the storage unit 150 to perform centralized control of each of units of the smartphone 101. In addition, the main control unit 100 has a mobile communication control function of controlling each of units of a communication system, and an application processing function, in order to perform voice communication and data communication through the wireless communication unit 110.

The application processing function is realized by allowing the main control unit 100 to operate in accordance with application software stored in the storage unit 150. The application processing function includes an infrared ray communication function of performing data communication with a counterpart device by controlling the external input-output unit 160, an electronic mail function of performing transmission and reception of an electronic mail, a Web browsing function of browsing a Webpage, and the like, for example.

In addition, the main control unit 100 includes an image processing function of displaying a video in the display input unit 120 on the basis of image data (data of a still image and a dynamic image) such as received data and downloaded streaming data, and the like. The image processing function is a function in which the main control unit 100 decodes the image data above and applies image processing to the decoded result to display the image in the display input unit 120.

Further, the main control unit 100 performs display control with respect to the display panel 121 and operation detection control of detecting a user operation through the operation unit 140 and the operation panel 122.

Performing the display control allows the main control unit 100 to display a software key such as an icon for starting up application software, and a scroll bar, or a window for creating an electronic mail. The scroll bar serves as a software key of receiving an instruction of moving a displaying portion of an image that is too large to fit in a display area of the display panel 121, and the like.

In addition, performing the operation detection control allows the main control unit 100 to detect a user operation through the operation unit 140, and receive an operation with respect to the icon described above and input of a character string into an input section of the window described above, through the operation panel 122, or receive a request for scrolling a display image, through the scroll bar.

Further, performing the operation detection control allows the main control unit 100 to have a touch panel control function of determining whether an operation position with respect to the operation panel 122 is an overlapping portion (display area) overlapped with the display panel 121 or an outer periphery (non-display area) other than the overlapping portion, which outer periphery does not overlap with the display panel 121, in order to control a sensitive area of the operation panel 122 and a display position of a software key.

The main control unit 100 is also capable of detecting a gesture operation with respect to the operation panel 122 to allow a predetermined function to be performed in accordance with the detected gesture operation. The gesture operation is not a conventional simple touch operation but an operation such as drawing a trail with a finger, assigning a plurality of positions at the same time, or drawing a trail for at least one of the plurality of positions in combination with both of them above.

The camera unit 141 is a digital camera for electronic photographing by using an imaging element such as a Complementary Metal-Oxide Semiconductor (CMOS), and a Charge Coupled Device (CCD). In addition, the camera unit 141 is capable of converting image data acquired by photographing into compressed image data such as a Joint Photographic coding Experts Group (JPEG) by control of the main control unit 100 to record the compressed image data in the storage unit 150 or output the compressed image data through the external input-output unit 160 or the wireless communication unit 110. In the smartphone 101 shown in FIG. 18, the camera unit 141 is mounted on a face in which the display input unit 120 is mounted, but a mounting position of the camera unit 141 is not limited to the above. The camera unit 141 may be mounted on a back face of the display input unit 120, or a plurality of camera units 141 may be mounted. In a case where a plurality of camera units 141 is mounted, it is possible to perform photographing with a camera unit 141 selected to be used for the photographing, as well as with using the plurality of camera units 141 at the same time.

In addition, the camera unit 141 is available to various functions of the smartphone 101. For example, it is possible to display an image acquired by the camera unit 141 in the display panel 121, as well as to use an image acquired by the camera unit 141 as one of operation inputs of the operation panel 122. When the GPS receiving unit 170 detects a position, it is also possible to detect the position with reference to an image received from the camera unit 141. Further, it is also possible to determine an optical axis direction of the camera unit 141 of the smartphone 101 with reference to an image received from the camera unit 141, without using a triaxial acceleration sensor, or together with using the triaxial acceleration sensor, as well as possible to determine present use environment. It is certainly possible to use an image received from the camera unit 141 in application software.

Other than the above, it is possible to record image data of a still image or a moving image in the storage unit 150 by adding information, such as location information acquired by the GPS receiving unit 170, voice information acquired by the microphone 132 (text information acquired by performing speech-to-text conversion with a main control unit and the like is available), and posture information acquired by the motion sensor unit 180, as well as possible to output the image data through the external input-output unit 160 and the wireless communication unit 110.

In the smartphone 101 described above, the camera unit 141 serves as the photographing sections 12, 12A, and 12B in FIGS. 1A to 1C; the main control unit 100 serves as the image processing sections 14, 14A, and 14B in FIGS. 1A to 1C; the operation unit 140 and the operation panel 122 serve as the user I/F 16 in FIGS. 1A to 1C; the main control unit 100 and the external input-output unit 160 serve as the input-output control section 18 in FIGS. 1A to 1C; the storage unit 150 serves as the storage section 20 in FIGS. 1A to 1C; and the display panel 121 serves as the display section 22 in FIGS. 1A to 1C.

What is claimed is:

1. An image processing apparatus that compresses image data according to a compression parameter, the image processing apparatus comprising:
   a data acquisition section that acquires information on whether photographing condition data is added to the image data inputted or not and content of the photographing condition data;
   a compression parameter determination section that determines the compression parameter according to an acquisition result of the photographing condition data in the data acquisition section; and
   a compression processing section that applies compression processing to the image data according to the determined compression parameter,
   wherein the photographing condition data includes information related to presence or absence of an optical low-pass filter at time of photographing an image of the image data, and
   wherein said compression processing section adjusts the compression parameter based on presence or absence of the optical low-pass filter.

2. The image processing apparatus as defined in claim 1, wherein the photographing condition data includes information related to a color filter array of a photographing section that is used at the time of photographing the image of the image data.

3. The image processing apparatus as defined in claim 1 into which image data of images photographed by a plurality of photographing sections including at least a first photographing section and a second photographing section is inputted, the image processing apparatus further comprising:
   a display section that indicates a compression level in such a manner that the compression level can be selected from among a plurality of selection candidates; and
   a selection section that receives a selection by a user with respect to the compression level,
   wherein the compression parameter determination section determines the compression parameter with respect to the image data of an image photographed by the first photographing section according to the acquisition result of the photographing condition data with respect to the image data of the image photographed by the first photographing section and a selection result of the compression level received through the selection section, and determines the compression parameter with respect to the image data of an image photographed by the second photographing section according to the acquisition result of the photographing condition data with respect to the image data of the image photographed by the second photographing section and the selection result of the compression level received through the selection section, and
   wherein the compression processing section applies the compression processing to each of the image data of the image photographed by the first photographing section and the image data of the image photographed by the second photographing section, according to the determined compression parameter.

4. The image processing apparatus as defined in claim 1, wherein:
   the image data includes luminance data; and
   the compression parameter is based on a ratio of the luminance data to color difference data.

5. The image processing apparatus as defined in claim 1, wherein the compression parameter is a compression rate.

6. The image processing apparatus as defined in claim 1, wherein:
   the compression processing is compression processing of a JPEG method that includes the steps of: calculating a DCT coefficient from the image data according to discrete cosine transform; and quantizing the DCT coefficient according to a quantization table, and
   the compression parameter is the quantization table.

7. The image processing apparatus as defined in claim 1, further comprising a display section that indicates a determination result of the compression parameter in the compression parameter determination section.

8. The image processing apparatus as defined in claim 7, wherein:
   the compression parameter determined by the compression parameter determination section includes a plurality of selection candidates;
   the display section indicates the compression parameter in such a manner that the compression level can be selected from among the plurality of selection candidates;
   the image processing apparatus further comprises a selection section that receives a selection by a user with respect to the compression parameter;
   the compression parameter determination section decides the compression parameter according to a selection result received through the selection section; and
   the compression processing section applies the compression processing to the image data according to the decided compression parameter.

9. The image processing apparatus as defined in claim 2, wherein the information related to the color filter array is information on whether or not color filters of a photographing section used at the time of photographing the image of the image data correspond to color filters arranged in a plurality of pixels including photoelectric conversion elements arranged in a first direction and a second direction perpendicular to the first direction in a manner of a predetermined color filter array, the color filter array including a predetermined basic array pattern in which the color filter array includes a first filter corresponding to a first color that most contributes to acquiring a luminance signal and second filters corresponding to two or more second colors other than the first color, the basic array pattern being repeatedly arranged in the first direction and the second direction, the first filter being arranged in each of lines in the first direction, the second direction and a third direction inclined at 45° to each of the first direction and the second direction of the color filter array, at least one or more of the second filters being arranged in each of lines in the first direction and the second direction of the color filter array in the basic array pattern, a ratio of a pixel number of the first color corresponding to the first filter being larger than a ratio of a pixel number of each of the second colors corresponding to the second filters.

10. The image processing apparatus as defined in claim 9, wherein the color filter array includes a part where two or more pixels of the first filter continues in each of a line in the first direction, a line in the second direction and a line in the third direction.

11. The image processing apparatus as defined in claim 9, wherein in the color filter array, the first filters are arranged at a center and four corners in a 3×3 pixel group, and the 3×3 pixel group is repeatedly arranged in the first direction and the second direction.

12. The image processing apparatus as defined in claim 9, wherein:
the second colors include a first constituent color and a second constituent color;
the predetermined basic array pattern is a square array pattern corresponding to 6×6 pixels; and
the color filter array includes a first array and a second array being alternately arranged in the first direction and the second direction, the first array corresponding to 3×3 pixels in which the first filters are arranged at a center and four corners and in which the second filters corresponding to the first constituent color are arranged in such a manner that the first filter at the center is positioned between the second filters corresponding to the first constituent color in the first direction and the second filters corresponding to the second constituent color are arranged in such a manner that the first filter at the center is positioned between the second filters corresponding to the second constituent color in the second direction, the second array corresponding to 3×3 pixels in which the first filters are arranged at a center and four corners and in which the second filters corresponding to the first constituent color are arranged in such a manner that the first filter at the center is positioned between the second filters corresponding to the first constituent color in the second direction and the second filters corresponding to the second constituent color are arranged in such a manner that the first filter at the center is positioned between the second filters corresponding to the second constituent color in the first direction.

13. The image processing apparatus as defined in claim 9, wherein the first color is green (G), and the second colors are red (R) and blue (B).

14. An image pickup apparatus comprising:
a photographing unit including a photographing section for photographing an image of image data; and
an image processing apparatus that compresses image data according to a compression parameter, the image processing apparatus comprising:
a data acquisition section that acquires information on whether photographing condition data is added to the image data inputted or not and content of the photographing condition data;
a compression parameter determination section that determines the compression parameter according to an acquisition result of the photographing condition data in the data acquisition section; and
a compression processing section that applies compression processing to the image data according to the determined compression parameter,
wherein the photographing condition data includes information related to presence or absence of an optical low-pass filter at time of photographing an image of the image data, and
wherein said compression processing section adjusts the compression parameter based on presence or absence of the optical low-pass filter.

15. An image pickup apparatus comprising:
a photographing unit having a plurality of photographing sections including at least a first photographing section and a second photographing section that photograph images of image data; and
an image processing apparatus that compresses image data according to a compression parameter, the image processing apparatus comprising:
a data acquisition section that acquires information on whether photographing condition data is added to the image data inputted or not and content of the photographing condition data;
a compression parameter determination section that determines the compression parameter according to an acquisition result of the photographing condition data in the data acquisition section; and
a compression processing section that applies compression processing to the image data according to the determined compression parameter,
wherein the photographing condition data includes information related to presence or absence of an optical low-pass filter at time of photographing an image of the image data, and
wherein said compression processing section adjusts the compression parameter based on presence or absence of the optical low-pass filter.

16. An image pickup apparatus comprising:
a photographing unit that includes a photographing section that photographs an image of image data that can be exchanged by a user, the photographing section being selectable from among a plurality of photographing sections including at least a first photographing section and a second photographing for exchange; and
an image processing apparatus that compresses image data according to a compression parameter, the image processing apparatus comprising:
a data acquisition section that acquires information on whether photographing condition data is added to the image data inputted or not and content of the photographing condition data;
a compression parameter determination section that determines the compression parameter according to an acquisition result of the photographing condition data in the data acquisition section; and
a compression processing section that applies compression processing to the image data according to the determined compression parameter,
wherein the photographing condition data includes information related to presence or absence of an optical low-pass filter at time of photographing an image of the image data, and
wherein said compression processing section adjusts the compression parameter based on presence or absence of the optical low-pass filter.

17. An image processing method comprising:
a data acquisition step of acquiring information on whether photographing condition data is added to image data inputted or not and content of the photographing condition data;
a compression parameter determination step of determining a compression parameter according to an acquisition result of the photographing condition data; and
a compression processing step of applying compression processing to the image data according to the determined compression parameter, wherein the photographing condition data includes information related to presence or absence of an optical low-pass filter at time of photographing an image of the image data and wherein said compression processing step adjusts the compression parameter based on presence or absence of the optical low-pass filter.

18. A computer readable non-transitory medium storing instructions causing a computer to perform an image processing method comprising the steps of:

acquiring information on whether photographing condition data is added to image data inputted or not and content of the photographing condition data;

determining a compression parameter according to an acquisition result of the photographing condition data; and applying compression processing to the image data according to the determined compression parameter, wherein the photographing condition data includes information related to presence or absence of an optical low-pass filter at time of photographing an image of the image data and adjusting the compression parameter based on presence or absence of the optical low-pass filter.

* * * * *